US006994387B1

(12) United States Patent
Ragner et al.

(10) Patent No.: US 6,994,387 B1
(45) Date of Patent: Feb. 7, 2006

(54) TORUS-SHAPED CONVEYER AND GRIPPER

(76) Inventors: Gary Dean Ragner, 711 SW. 75th St. #103, Gainesville, FL (US) 32607; William Ross Kinney, 38580 SW. Hartley Rd., Gaston, OR (US) 97119

( * ) Notice: Subject to any disclaimer, the term of this patent is extended or adjusted under 35 U.S.C. 154(b) by 0 days.

(21) Appl. No.: 11/013,526

(22) Filed: Dec. 16, 2004

Related U.S. Application Data

(62) Division of application No. 10/213,192, filed on Aug. 6, 2002, now Pat. No. 6,846,029.

(60) Provisional application No. 60/311,174, filed on Aug. 9, 2001.

(51) Int. Cl.
*B65G 47/90* (2006.01)
*B25J 15/00* (2006.01)

(52) U.S. Cl. ..................... 294/86.4; 198/626.6; 901/30

(58) Field of Classification Search ................. 294/1.1, 294/86.4, 99.1, 119.3, 98.1; 901/30, 31, 901/36, 39; 56/328.1, 330, 332; 198/626.2, 198/626.3, 626.4
See application file for complete search history.

(56) References Cited

U.S. PATENT DOCUMENTS 3,347,545 A 10/1967 Nichols

FOREIGN PATENT DOCUMENTS

WO WO 01/79089 A1 3/1988
WO WO 88/01924 * 3/1988

OTHER PUBLICATIONS

Photo of Torus-shaped toy. (taken by Applicant), no date.

* cited by examiner

*Primary Examiner*—Dean J. Kramer

(57) ABSTRACT

A device for gripping, holding, releasing, and conveying objects of varying sizes and shapes, comprising an elongated torus (120) enclosing a fluid material (121), an outer roller assembly (136), and an inner roller assembly (134). Torus (120) may be made of a flexible membrane and able to seal in fluid material (121). Fluid material (121) can be a gas, liquid, solid particles, semisolid particles, or mixtures of these. Central channel (128) of torus (120) is collapsed due to pressure of fluid material (121) within torus (120). Gripping and conveying action is achieved by rolling motion of roller assemblies (134) and (136) which move collapsed channel (128) along the longitudinal (elongated) axis of torus (120). This causes front portion of the torus to slide radially inward to grip objects. Further movement of the roller assemblies can cause the object to be pulled completely inside the collapsed channel (121) and conveyed to the rear portion of the collapsed channel and out of torus (120). The soft flexible nature of torus (30) allows grasping even the most delicate objects without damaging them. Even over-ripe strawberries can be rapidly grasped without bruising.

19 Claims, 17 Drawing Sheets

MODE 2

MODE 3

MODE 4

Figures 1A, 1B:
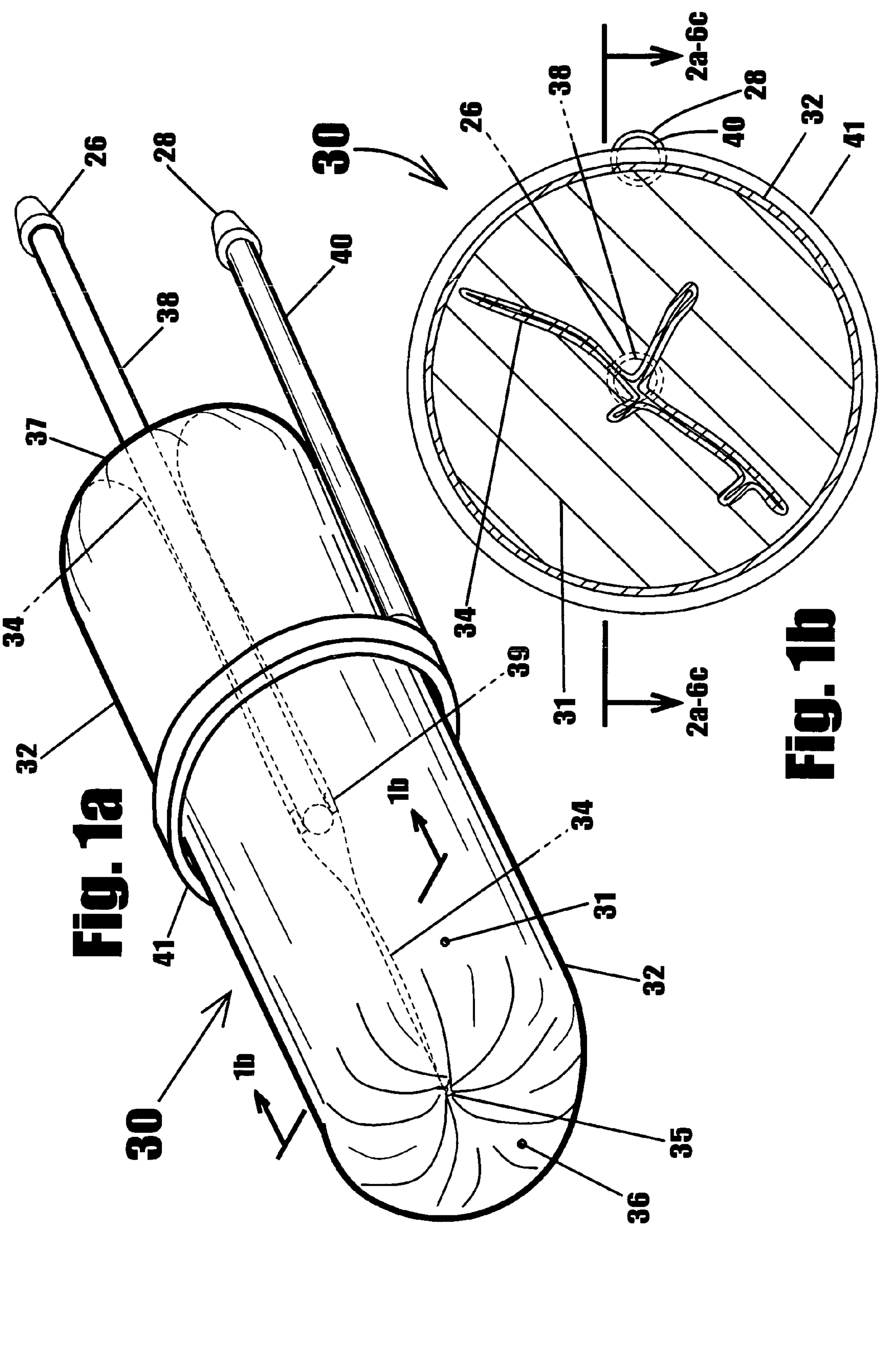

MODE 5
30
32
36
38
40
65
67
71

TORUS-SHAPED CONVEYER AND GRIPPER

CROSS-REFERENCE TO RELATED APPLICATIONS

This is a division of application Ser. No. 10/213,192, filed Aug. 6, 2002, now U.S. Pat. No. 6,846,029, titled "Torus-Shaped Mechanical Gripper" and claims priority from U.S. Provisional Application Ser. No. 60/311,174 titled "Torus-Shaped Mechanical Gripper" filed on Aug. 9, 2001. It is intended that utility application Ser. No. 10/213,192 be incorporate in its entirety into this divisional patent application.

BACKGROUND

This invention pertains to mechanical gripping devices that can grip and release objects by mechanical control and more specifically to mechanical gripping devices that grip by radial sliding-action of gripping surfaces.

DESCRIPTION OF PRIOR ART

The use of grippers on robotic arms has existed for the last few decades, as robots have become more common in factories and other businesses. These grippers or robotic hands are used by robotic arms to grip objects and perform functions such as moving objects, inserting parts, sorting parts, and etc. Prior art shows many types and styles of mechanical grippers (or hands), most of which use fingers or claws to grab and hold objects. No references were found that allow continous gripping and conveying of objects in one direction like the disclosed invention. Furthermore, none were found that use a torus shaped membrane as a conveying mechanism. Such three-dimensional rotating conveyers appear to be completely novel to the robotic gripper field. The use of a elongated torus for gripping and releasing objects with one end of the torus gripper is not new and exists in a number of prior art inventions, such as International publication number WO 01/79089 A1 to Marshall, and International publication number WO 88/01924 to Clemons. However, none show an elongated torus being used as a conveyer. Some of these advantages and abilities are listed below.

OBJECTIVES AND ADVANTAGES

Below is a list of objects and advantages of our invention:

a) Extremely simple gripper design.
b) Simple actuator control.
c) Inexpensive to manufacture, having a very simple design.
d) Can be very lightweight when air or other gas is used as the pressurizing fluid.
e) Soft contact interface allows gripping of objects even when a large vertical misalignment of the gripper (also operating in "MODE 1", discussed in the "Operational Description" section of this patent, allows even greater vertical misalignment).
f) The gripper is naturally alignment tolerant, and horizontal misalignments as large as the radius of the gripper end itself still allows secure gripping of objects. In general, if the gripper end can make contact with the object, the gripper can pull the object inward toward its center and pick it up regardless of the objects position or orientation.

g) The soft contact surfaces allow overshooting the object without causing damage to the object or the gripper.
h) The gripper's soft gripping structure conforms around an object with very controlled contact forces to allow picking up very fragile objects without breaking them.
i) Soft gripping surfaces provide even pressure over an object's surface, which allow quickly grasping the most delicate fruit without damaging them (for example over-ripe strawberries).
j) The ability to completely surround object being gripped provides nearly zero-chance of dropping the object.
k) Easy attachment to robotic arm allows quick replacement and versatile gripping action.
l) The gripper allows several items to be picked up at one time by a single gripper.
m) For a roller-driven gripper, objects can be continually picked-up and transferred to another location.
n) Roller-driven grippers can be extended so they act as both a robotic gripper and a completely enclosed conveyer belt
o) The generally round shape of the gripper end can easily be reshaped by support structures for a specific purpose.
p) Other tools can easily be mounted with the gripper to provide additional functions.
q) Its central channel design allows a video camera to be mounted within the central channel so that the camera is exactly centered on the gripping area of the torus. This makes moving the gripper to the object much easier since the camera is directly in line with the gripper.
r) The central channel of the gripper can be widened by shaping surfaces for allowing a cavity to form at the end of the torus. This allows the torus membrane to collapse from the sides around and object resulting in near zero "net force" on the object being gripped. The result is objects can be grasped without being pushed away by the torus (for example, grasping hanging fruit or grasping an object floating in space).

DRAWING FIGURES

FIG. 1*a* Basic Torus Gripper design in perspective.

FIG. 1*b* Section view of Gripper cut perpendicular to its symmetric axis.

FIGS. 2*a–d* First mode of gripping for preferred design shown in section view.

FIGS. 3*a–d* Second mode of gripping for preferred design shown in section view.

Figures 4A, 4B, 4C:
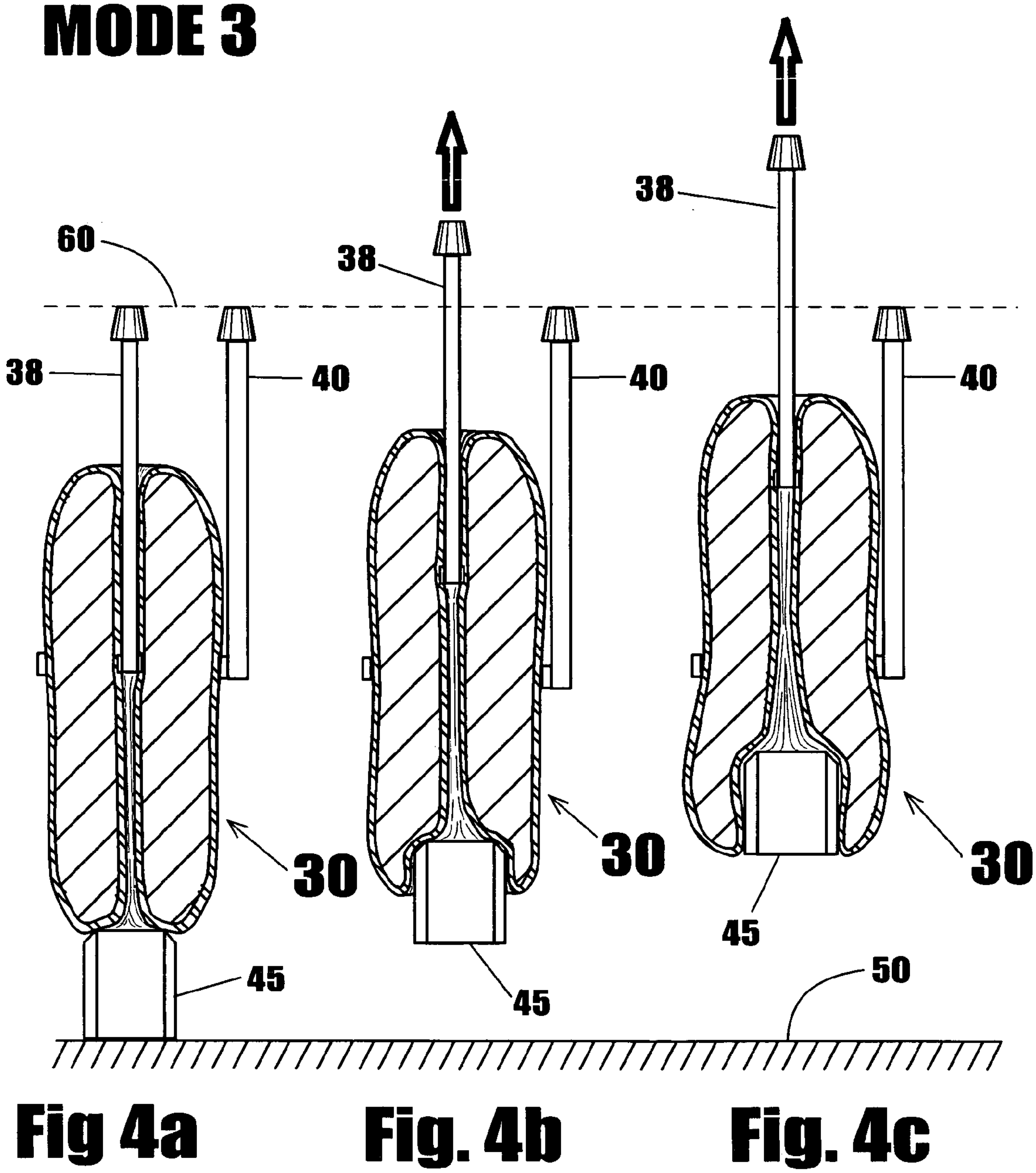

FIGS. 4*a–c* Third mode of gripping for preferred design shown in section view.

Figures 5A, 5B, 5C:
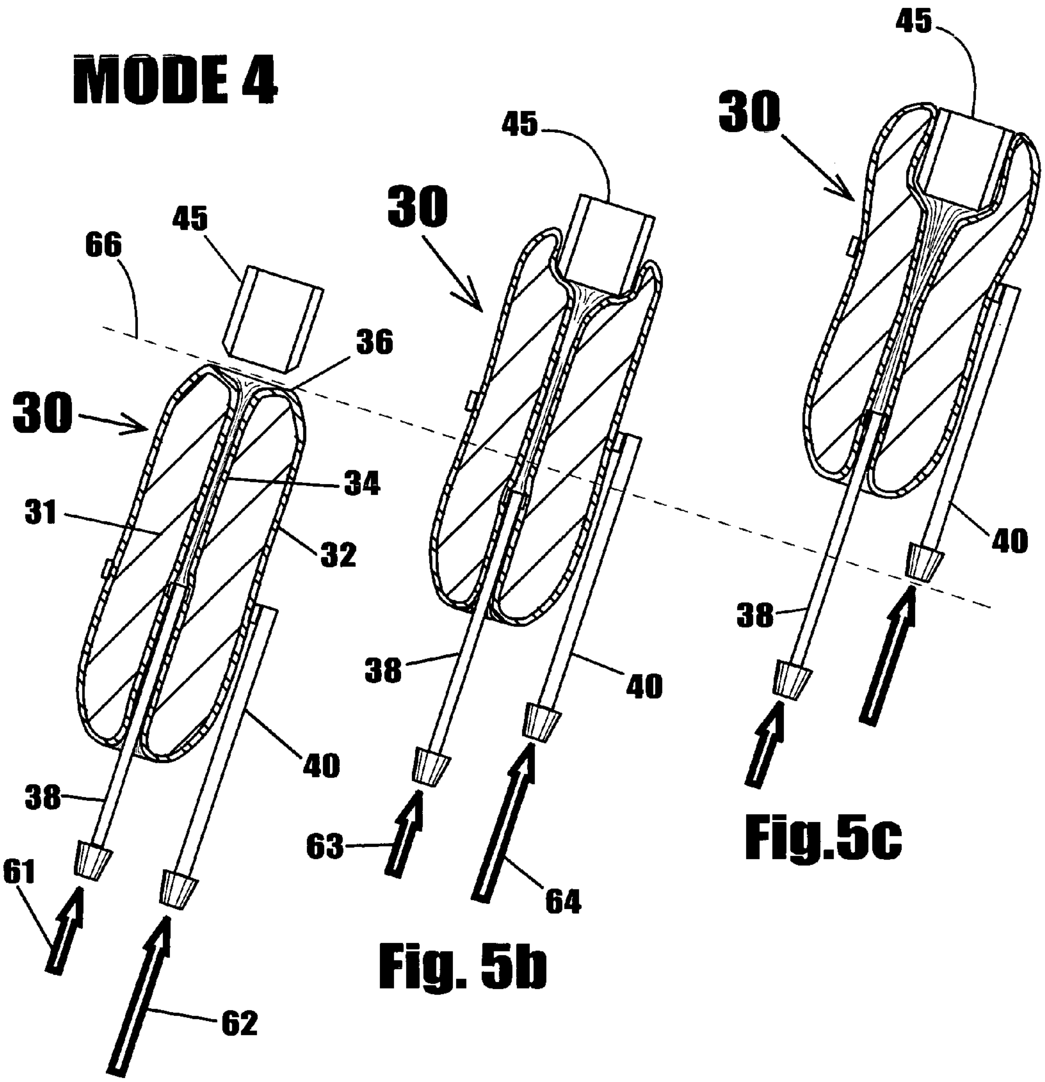

FIGS. 5*a–c* Fourth mode of gripping for preferred design shown in section view.

Figures 6A, 6B, 6C:
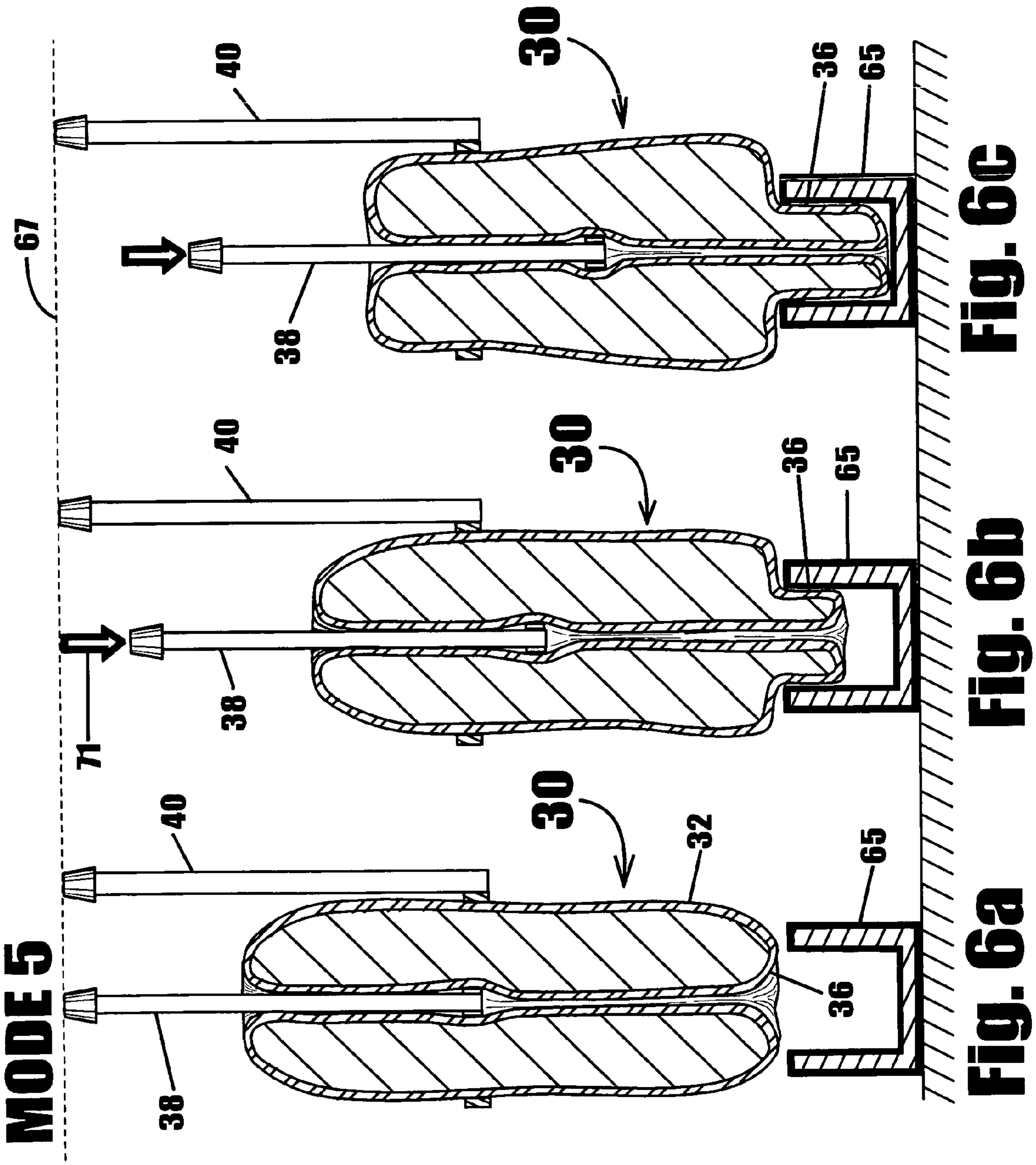

FIGS. 6*a–c* Fifth mode of gripping for preferred design shown in section view.

Figure 7:
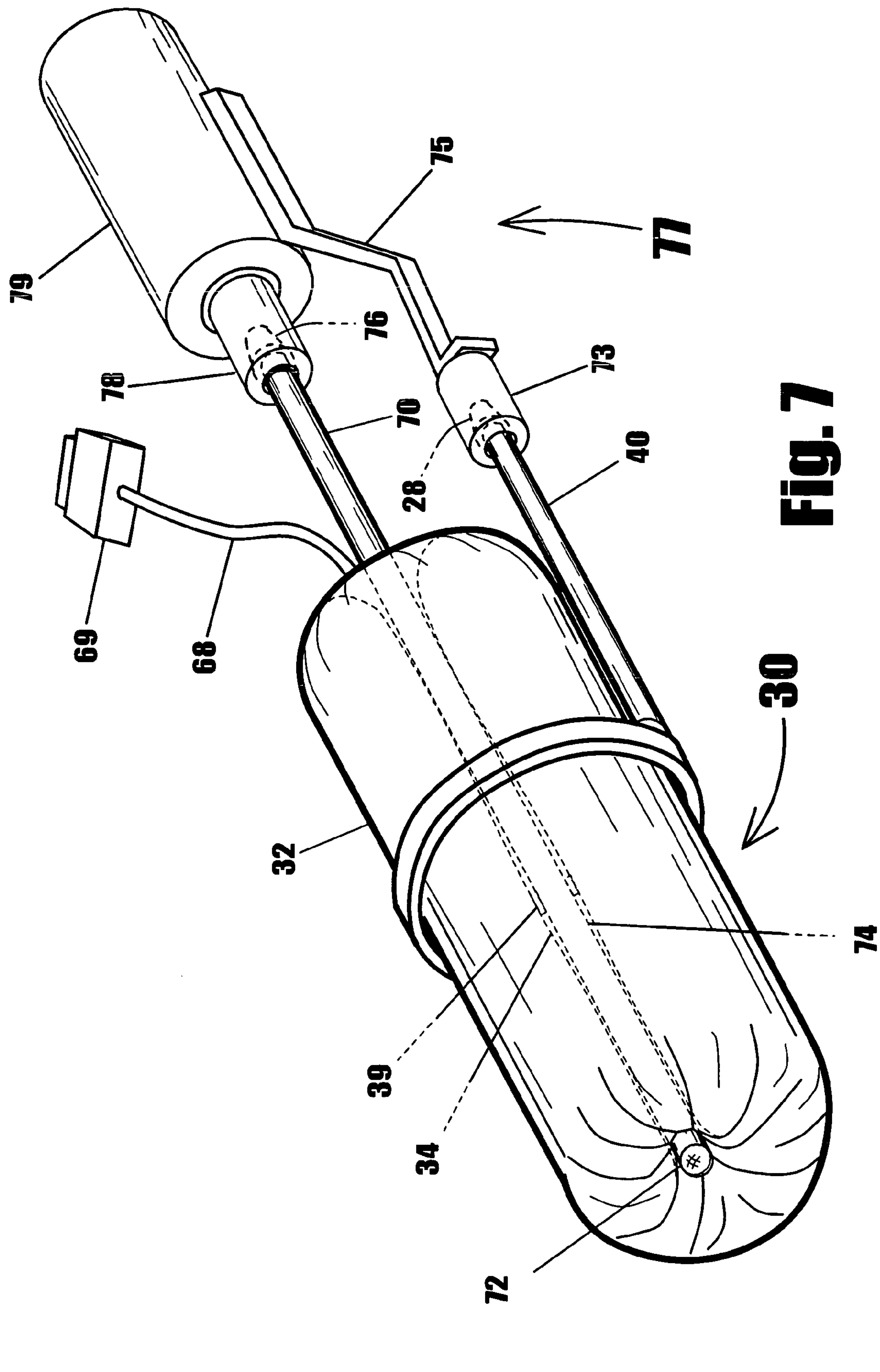
Figure 8:
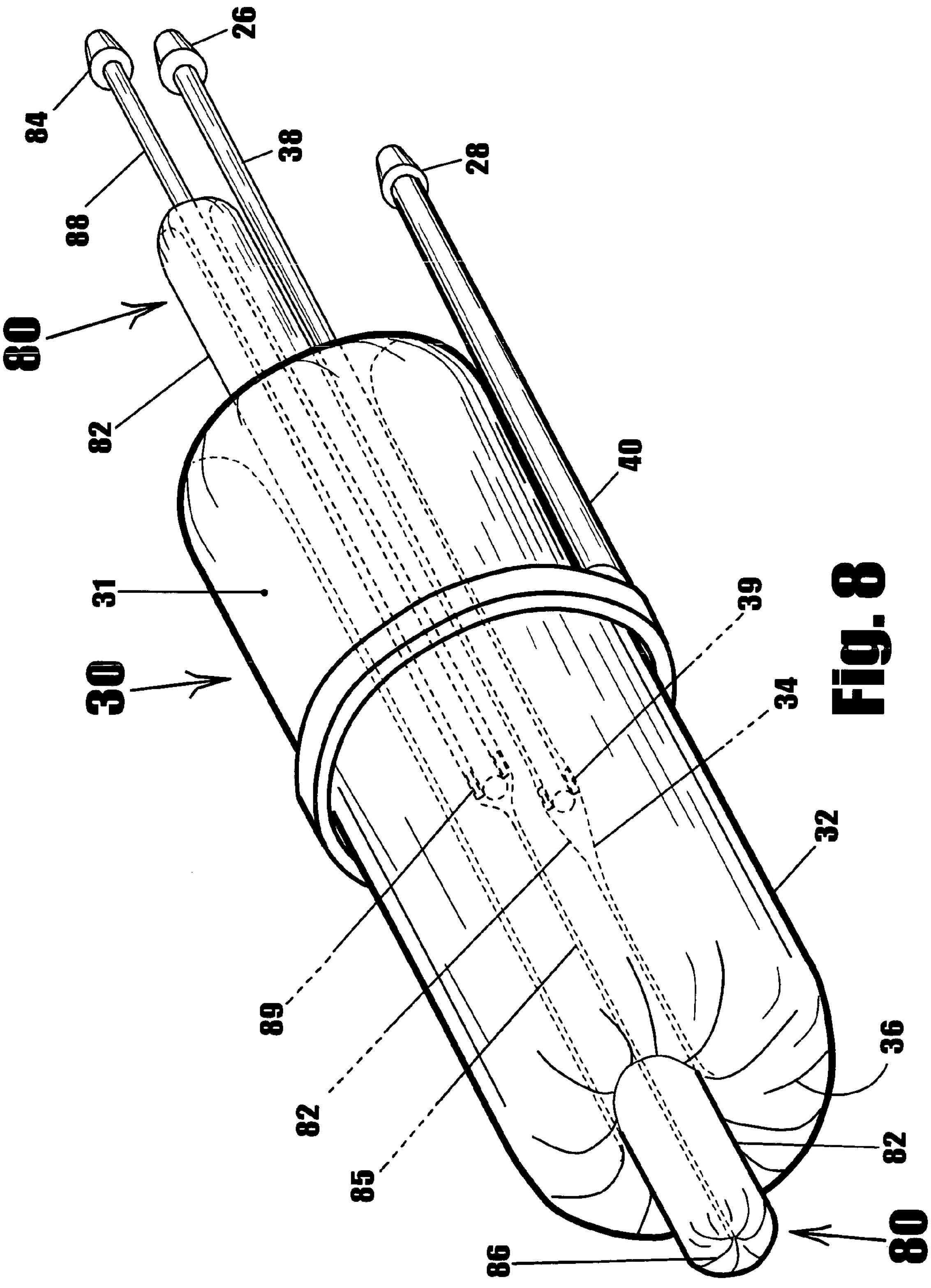

FIG. 7 Gripper design with video camera mounted along symmetric axis of the torus FIG. 8 Alternative Gripper design with nested gripper.

Figure 9:
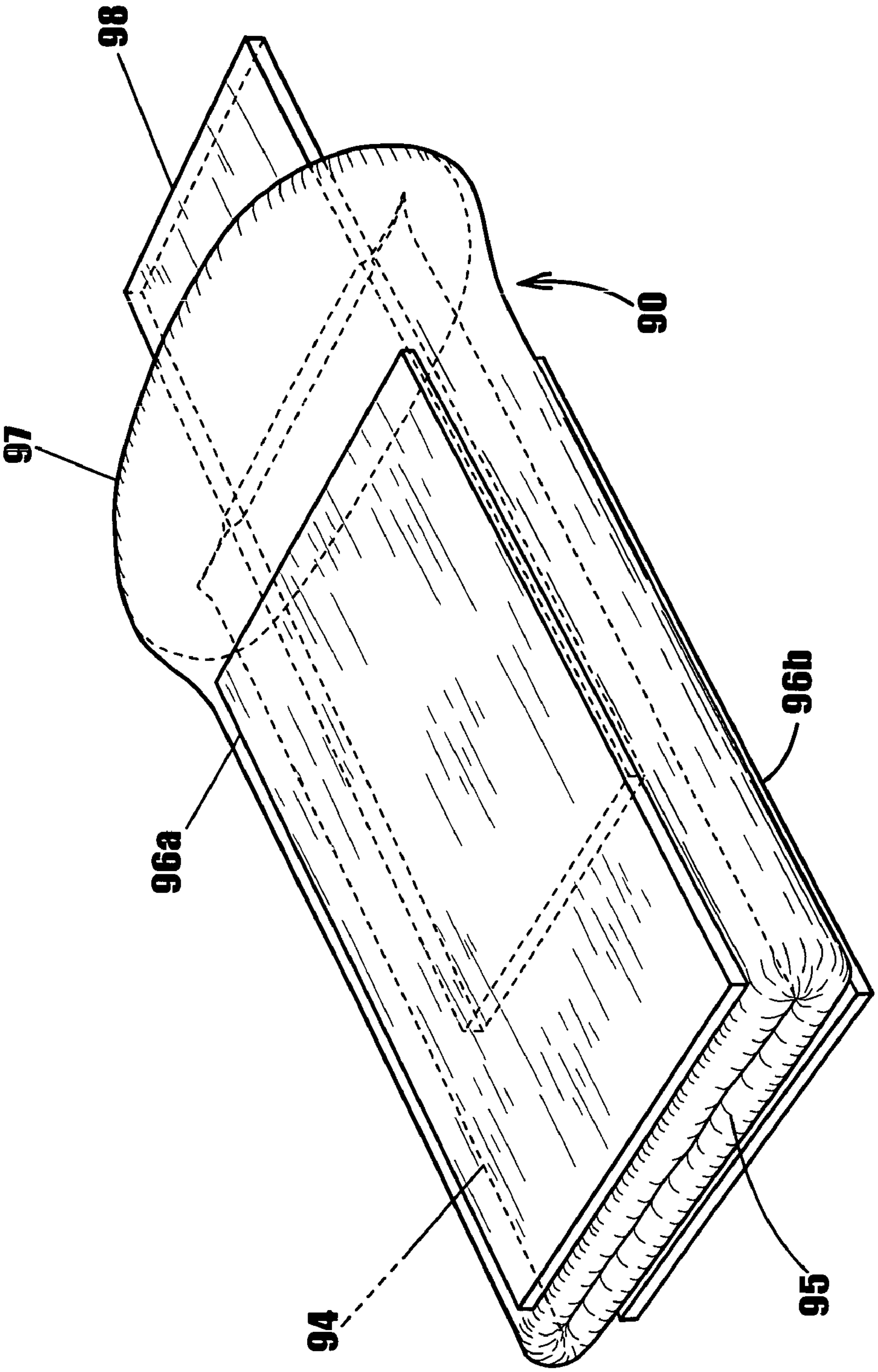

FIG. 9 Alternative Gripper with flattening guide plates to shape the Gripper's gripping zone.

Figures 10A, 10B:
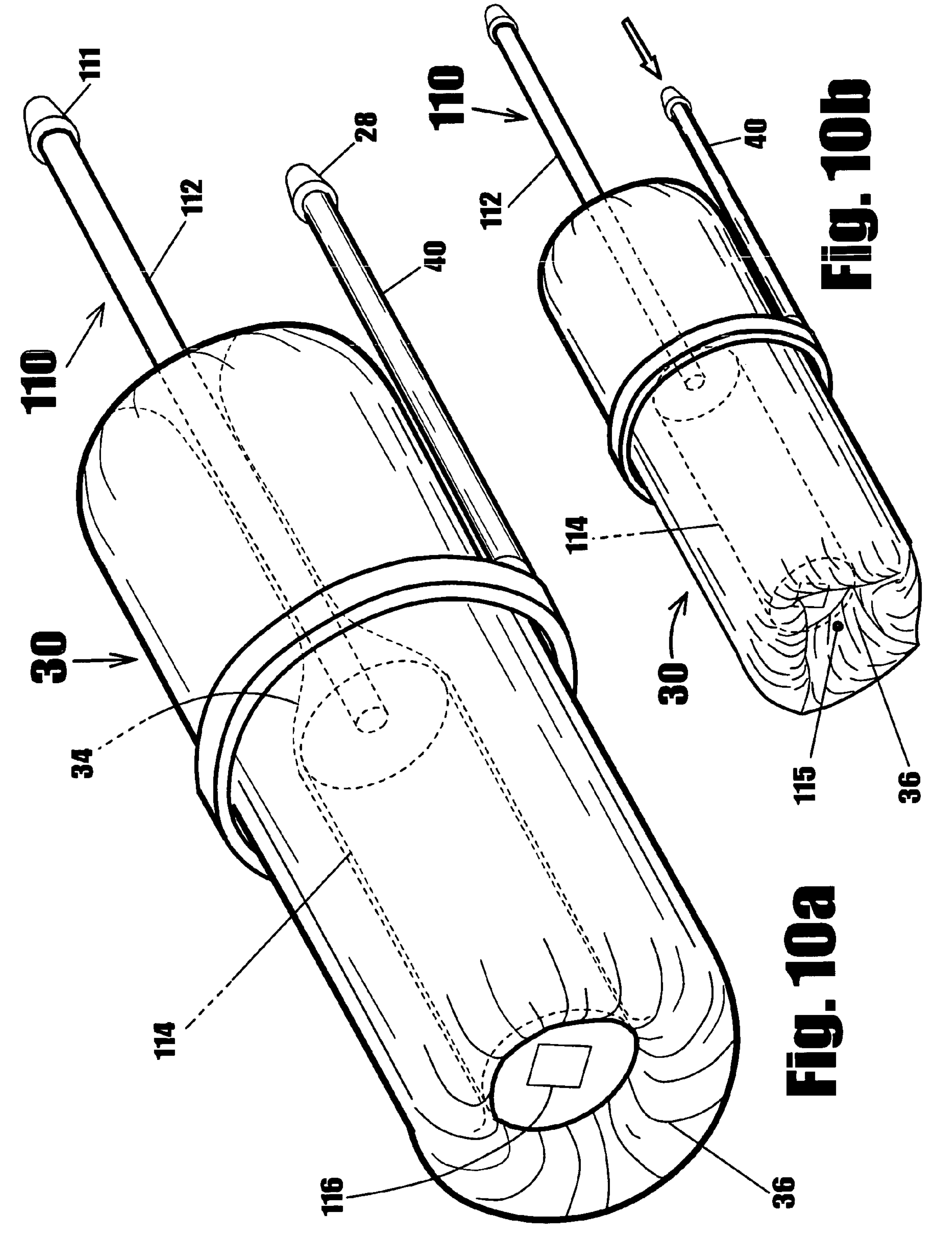

FIGS. 10*a–b* Gripper with oversized central control rod.

Figure 11:
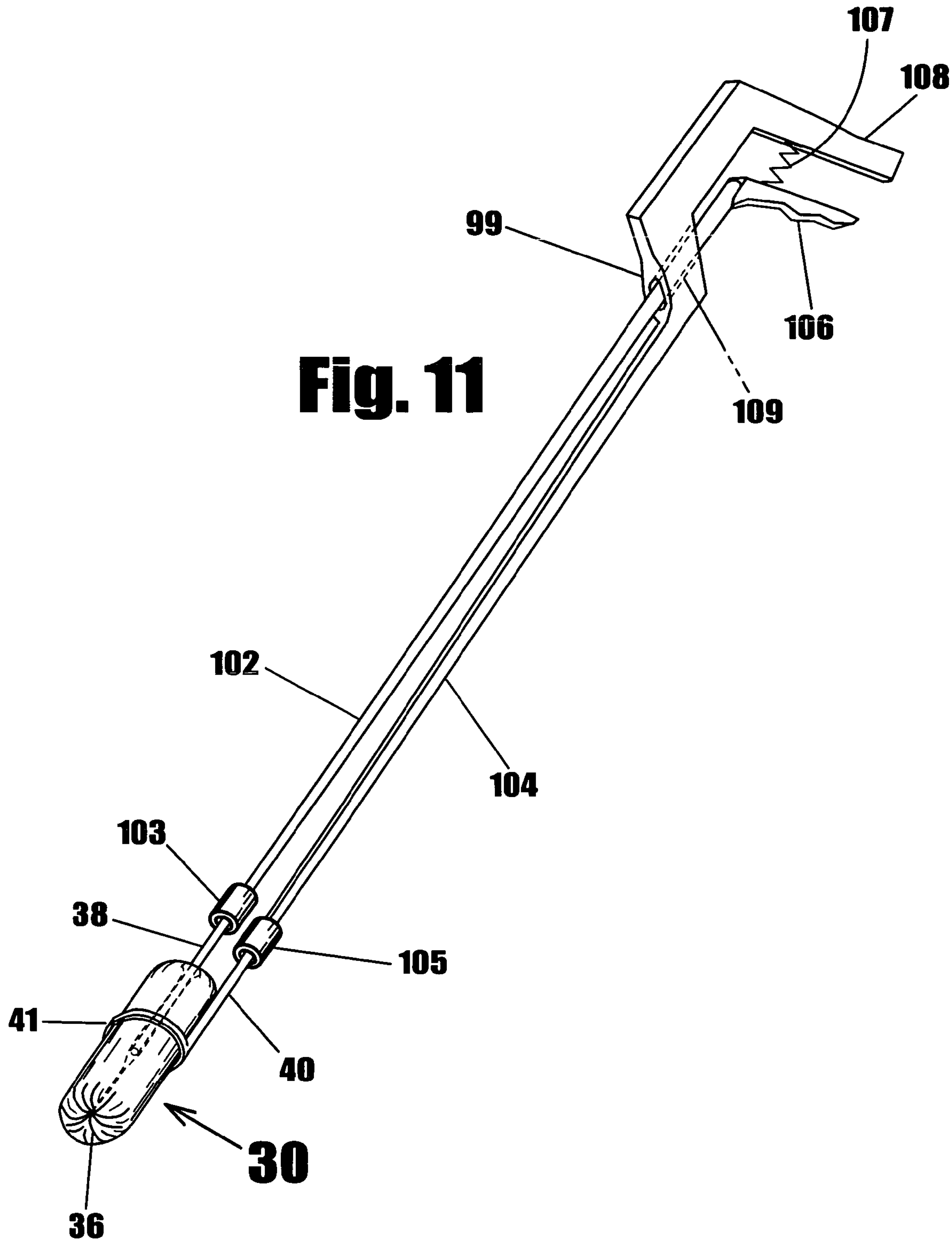

FIG. 11 Gripper with hand operated actuator.

FIGS. 12*a–e* Preferred conveyer with roller-drive for continuous gripping action.

Figure 13:
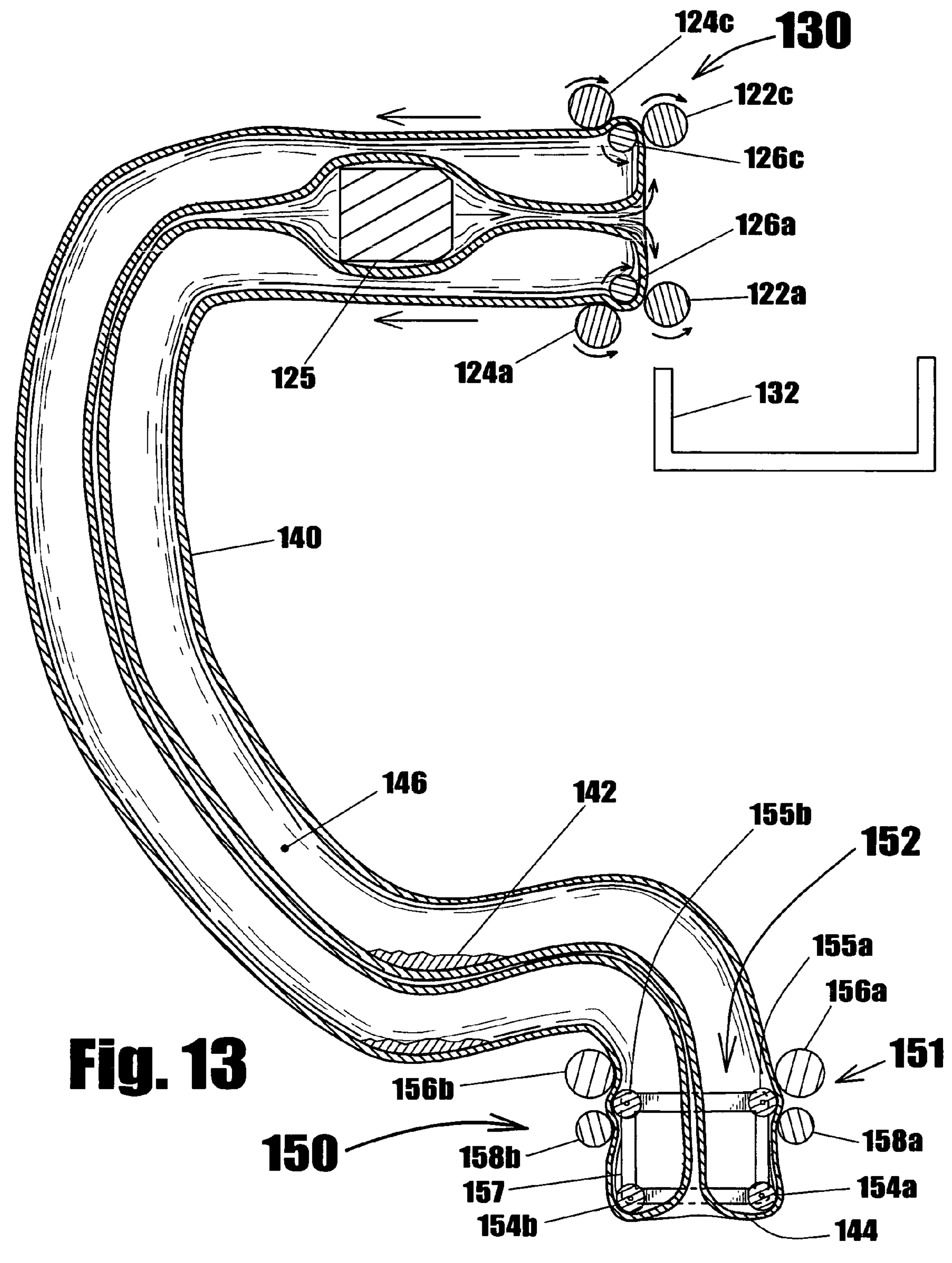

FIG. 13 Alternative conveyer with extended torus body and roller-drive.

Figure 14:
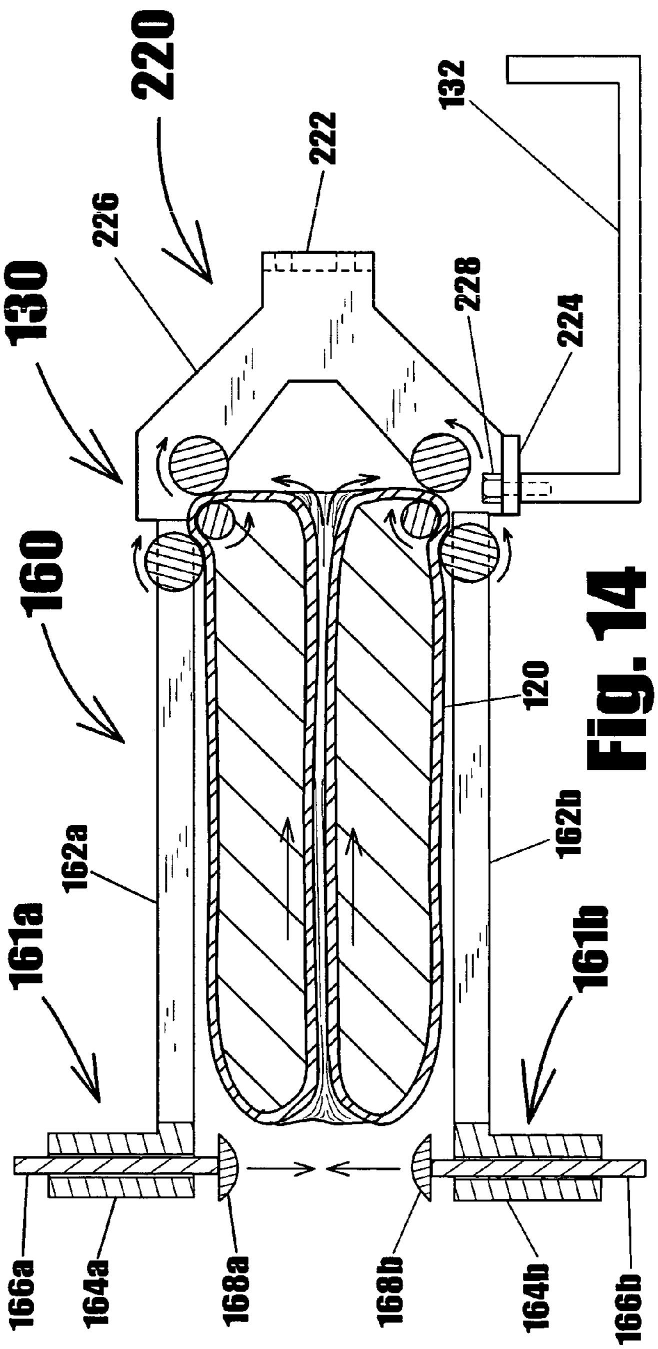

FIG. 14 Preferred conveyer with tools mounted on end.

Figure 15:
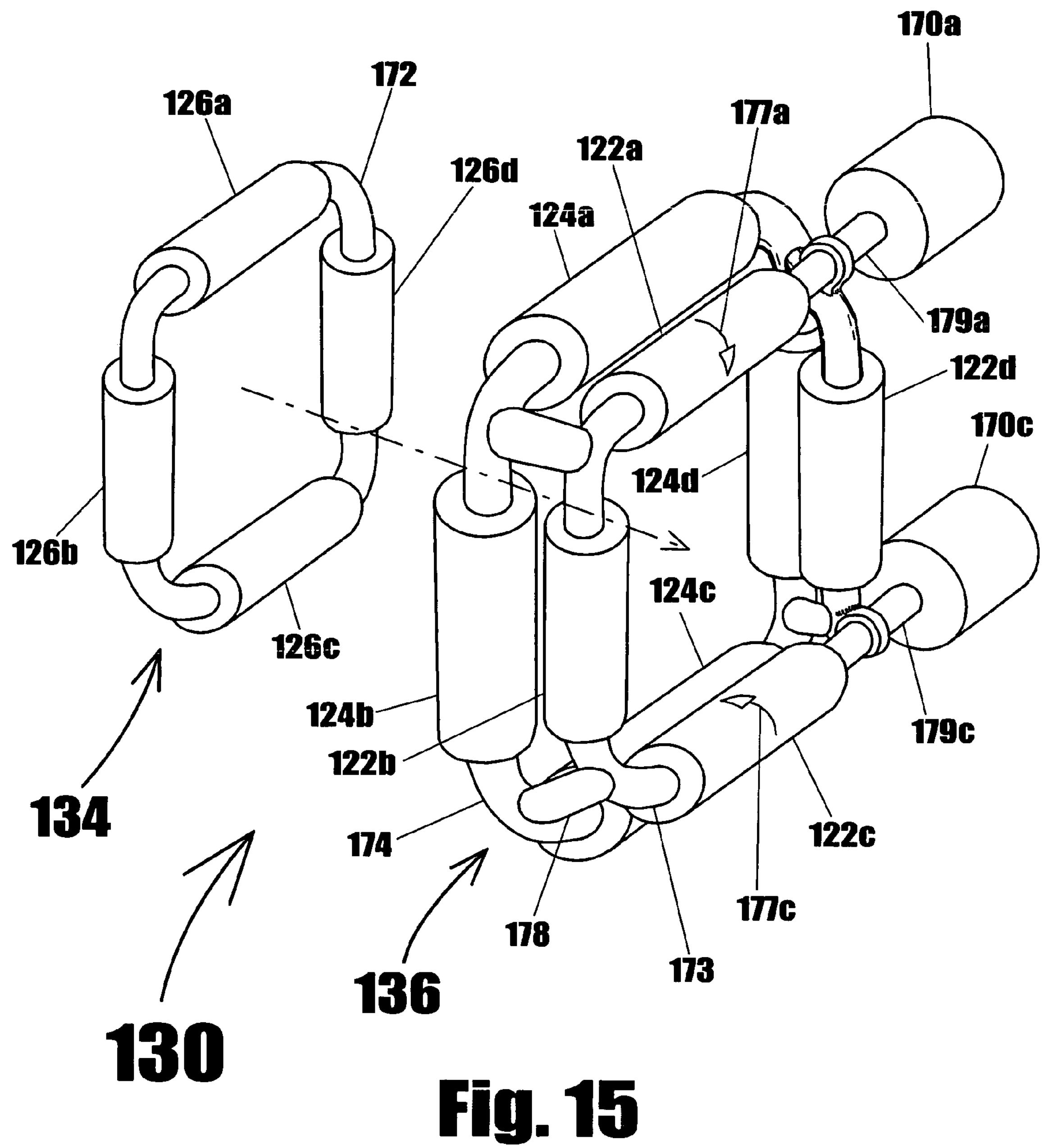

FIG. 15 Preferred conveyer roller drive mechanism

Figures 16A, 16B:
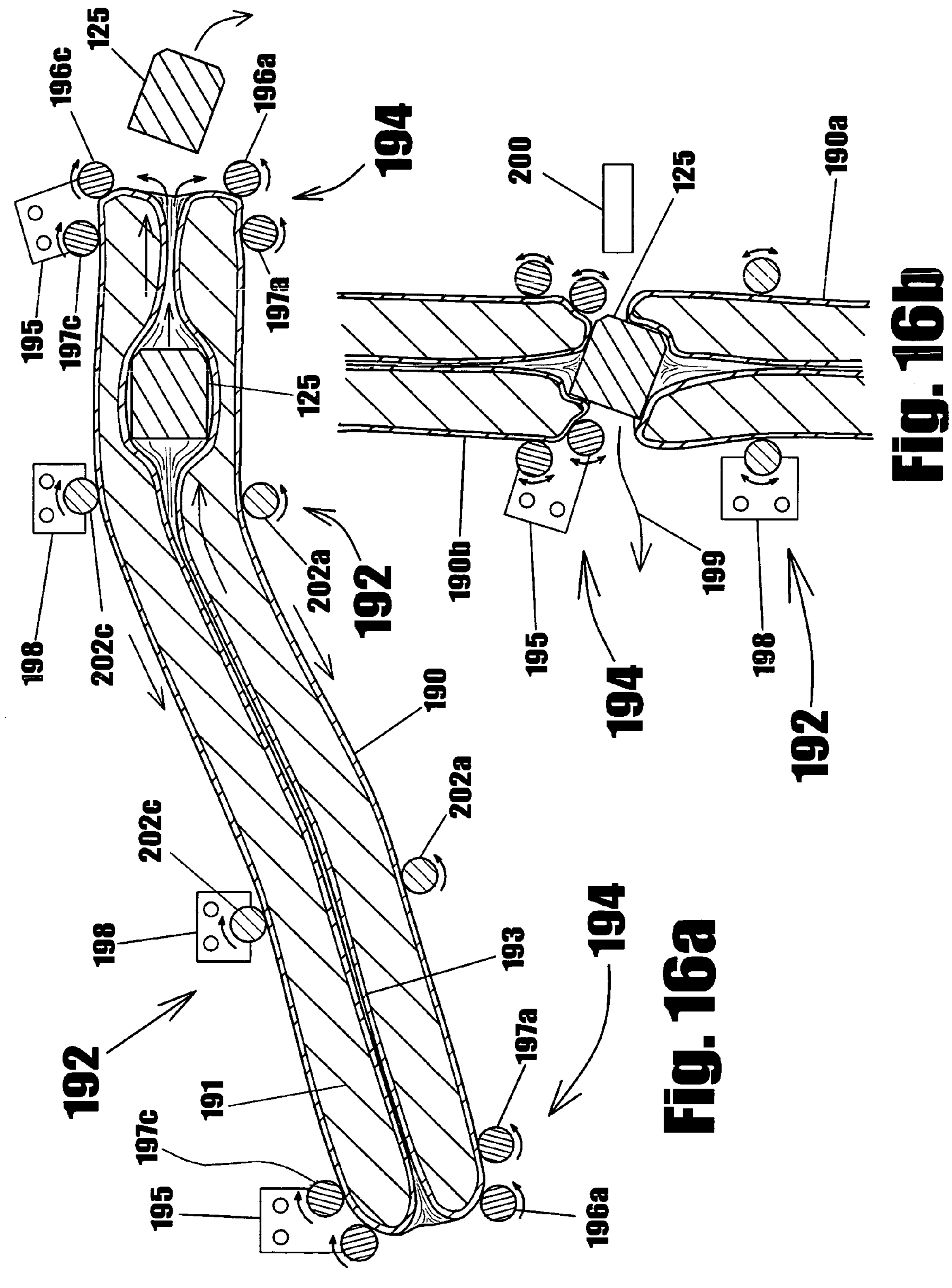

FIGS. 16*a–b* Alternative conveyer arrangement used as an enclosed conveyer belt.

Figure 17:
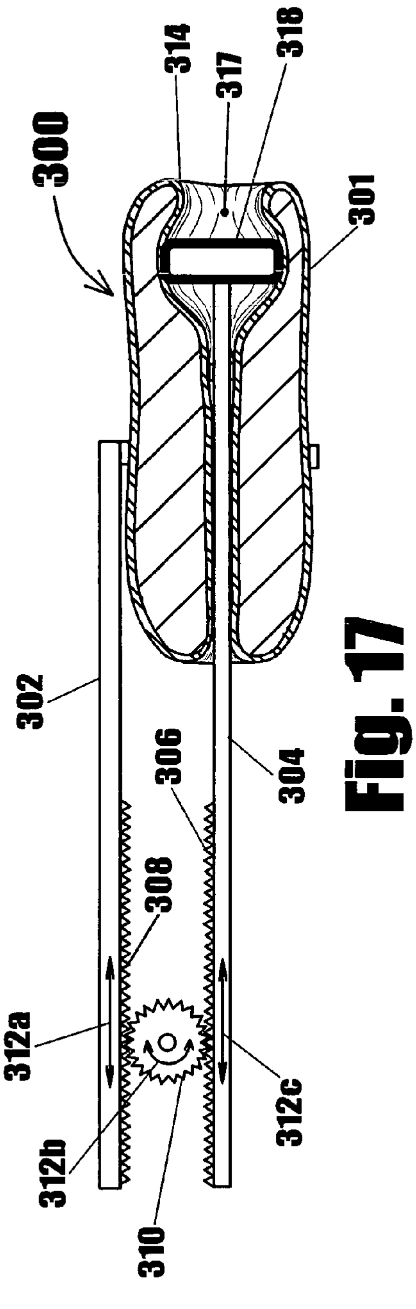

FIG. 17 Alternative Gripper driven by a rotating gear.

The disclosed mechanical hand (or robotic gripper) design is constructed from an elongated torus shaped bladder or membrane, which provides a very simple and soft structure that has exceptional gripping abilities. The torus membrane is flexible and stretchable enough to allow the portion of the torus compressed along the center axis (symmetric axis or longitudinal axis) to be rotated freely to the outside of the torus by rolling the membrane longitudinally around its torus shaped interior volume. A fluid material inside the torus gives the gripper a predictable shape. The fluid may be pressurized within the torus or at atmospheric pressure depending on the gripping desired. With the fluid at atmospheric pressures the torus membrane is loose and allows objects to deform the torus with very little applied pressure. A pressurized torus may provide a more consistent grip, as internal pressure would forces the membrane against different sized object along its central axis. Gripping force would depend on the resilience of the torus material, the fluid pressure, and the size of the object with relationship to the torus. All these factors can be adjusted to customize control for different gripping jobs.

Throughout this application the term “fluid” or “fluid material” will be used to define a material that acts substantially like a fluid, such as, a gas, a liquid, solid particles, semi-solid particles or other material that behaves like a fluid. Small particles exhibit fluid like behavior when they are made of low friction materials such as plastic beads. A Low coefficient of friction allows the beads to slide pass one another and act like a fluid. Making the beads hollow and deformable would increase the beads ability to slide pass one another, thus reducing friction and allowing the beads act more like a fluid.

The gripper can be actuated (for gripping action) by a number of methods. The most simple actuating method may be to hold the central channel portion of the torus stationary and use a single linear actuator to drive the outer surface of the torus forward and backward for gripping and releasing respectfully (see Mode 1, FIGS. 2*a–d*). The torus can also be driven by roller action to provide continuous motion to the torus (see FIGS. 12*a–e*). Both actuating methods generate a rolling motion of the torus, which results in the collapsed portion of the membrane along the central axis of the torus to slide in the opposite direction as the outer portion of the torus membrane. This motion allows one or both ends of the elongated torus to be used for gripping. This gripping action is produced as the torus membrane on the outer surface collapses and slides inward radially toward the collapsed central axis of the torus. It is this radial sliding process at the ends of the elongated torus membrane that provides the gripping action for grabbing and pulling objects inside the torus.

DETAILED DESCRIPTION OF THE PREFERRED EMBODIMENTS

In FIG. 1*a* we see a simple robotic gripper comprising of an elongated torus 30, and a pair of control rods 38 and 40. Torus 30 is made of a stretchable membrane material such as rubber, latex, or other stretchable material which allows the membrane to be rotate around its interior volume. Torus shaped membrane 30 is made sufficiently flexible to allow collapsed channel portion 34 of the torus to be rotation to the expanded exterior surface 32 of the torus. Torus 30 has a high coefficient of friction to help it grip objects, and comprises an exterior section 32, a collapsed interior portion 34, and end transition portions 36 and 37. Torus 30 can be manufactured in a number of way, including: 1) blow molding—where rubberized plastic is expanded in a torus shaped mold, 2) spin molding—where liquid polymer is put in a torus shaped mold and rotated to coat all the surfaces of the mold, 3) single weld—using a single tube of stretchable material and threading one end through the tube to the other end and sealing the two ends of the tube together, 4) double weld—using two tubes of stretchable material one placed inside the other, and end to end, then sealing adjacent ends of the tubes together, and many other methods. This torus structure allows the membrane to be rotated about its interior volume so that any physical piece of the membrane can be moved to outer portion 32, collapsed portion 34, or transition portions 36 and 37 and actually become that portion of the torus. Restated, this rotation about its interior volume allows a specific piece the membrane to alternate between the exterior portion 32 and interior collapsed portion 34 of the torus. To achieve this rotation, torus membrane 30 must be sufficiently flexible to transition at the ends of the torus between inner channel 34 and outer surface 32.

Control rod 38 is attached to the collapsed portion of the torus by connector 39 which may consist of any number of standard adhesive or bonding methods. Mounting bracket 26 is attached to the end of control rod 38 to provide a removable attachment to a linear actuator or stationary support depending on the type of operation desired. Control rod 40 is attached to the torus on its outer portion 32 in a similar manner by standard bonding methods (i.e. adhesives, fusion, glue, friction due to physical contact between control rods and torus, and etc.). Mounting bracket 28 is attached to the rear portion of control rod 40 for removable attachment to a linear actuator or stationary support. One or both control rods 38 and 40 may be attached to a computer controlled actuator with mounting brackets 26 and 28 to provide the necessary sliding action between the collapsed inner channel 34 and outer portion 32 of the torus. When a single actuator is used, one of the control rod may be attached to a stationary mount, while the other is attached to a linear actuator (see FIG. 7). Activating this single actuator would produce longitudinal sliding of surfaces 32 and 34 with respect to each other even though only one of the surfaces is being moved (and also causes the torus shaped membrane to rotate longitudinally around its interior volume). This in turn causes a radial sliding of portion 36 of the torus. It is this radial sliding motion that is used to grasp objects. Ideally, mounting brackets 26 and 28 would snap fit into connectors on the end of a robotic arm. The robotic arm may then provide positioning of the gripper end, power to any tools on the gripper, and linear actuator movement needed for gripping. This greatly reduces the amount of physical structure that needs to be replaced when torus membrane 30 wears out. Only the control rods and the torus are replaced. The expensive linear actuators, robotic arm structure, and tools, which have a much longer useful life, are reused.

To provide consistent shape to torus 30, the torus membrane is filled with a fluid material 31 which preferably would be a gas such as air, but could also be a liquid, solid or semi-solid particle mixture. If a liquid is used it can act as a lubricant to reduce friction of the torus membrane interior against itself. If a gas, solid particles, or semi-solid particles are used as the fluid material, a lubricant should be included to reduce friction of the membrane against itself, between solid particles and the membrane, and between solid particles themselves (where we use the term solid particles to mean both solid, semisolid or a mixture of solid and semisolid particles). This lubricant can also include solid coatings on the interior of the torus. In this preferred design the torus is slightly pressurized by the fluid to stretch the torus material and give it shape. This causes collapsed portion 34 of the torus to collapse so tightly that the channel formed becomes nearly airtight from one end to the other.

The gripper in FIG. 1*a* is designed for mounting on a robotic arm that has one or more linear actuators. Mounting brackets 26 and 28 are designed to snap fit into a receiving ports on linear actuators (see FIG. 7 for example). This ability to snap off and on a mechanical arm makes for easy low-cost replacement. A linear actuator such as a solenoid, screw drive, linear motor, hydraulics, pneumatics, etc. are then used to drive one or both control rods 38 and 40. The linear actuators provide the forward and backward movement of the control rods along the longitudinal axis of the torus to grasp objects. There is almost an unlimited number of ways control rods 38 and 40 could be driven by actuators, and such technology is well known. Even a single stepper motor can easily be used to drive both control rods at the same time. A simple driving belt that is attached to connectors 26 and 28, can be looped over the stepper motor shaft so when it rotates one control rod moves forward while the other would move backward. Such actuators can easily be adapted to fit on any robotic arm. Linear actuators can also be built permanently onto control rods (control members) 38 and 40 so the gripper can act as a complete unit without special actuators built onto the robotic arm (see FIG. 17). The means to provide linear actuation of control rods 38 and 40 is well known and many off the shelf systems exist for accomplishing this task.

FIG. 1*b* shows a section view of the gripper in FIG. 1*a* cut perpendicular to the torus's longitudinal axis (symmetric axis or central axis). Notice how the collapsed portion 34 compresses the stretchable membrane into flat sections with very little space between the surfaces. It is within this space that objects are surrounded by the membrane and securely grasped.

FIGS. 2 through 6 show the operation of the gripper section in FIGS. 1*a* and 1*b* and are discussed in great detail in the operational section of this patent. These figures are in section view cut parallel to the symmetric axis and show torus 30 gripping objects 45 and 65. The higher the friction coefficient for torus membrane 30, the better the gripper is able to grab objects, and the less contact force that is needed to grab an object.

In FIG. 7 we see the torus shaped gripper in FIG. 1*a*, but with a different central control rod 70. Control rod 70 is fixed to the torus with connector 39 and has attachment bracket 76 on the rear end. Control rod 70 also has an additional extension 74 attached on its front end which houses a camera 72 (video, or still). Extension 74 extends the camera out to the end of the torus. Note the length of section 74 beyond bracket 39 is not very critical as long as camera 72 can be pulled sufficiently inside channel 34 to grip objects effectively. In practice, attachment point 39 may be placed closer to camera 72 to allow the greatest amount of movement of control rod 70. When control rod 70 is extended forward as shown, camera 72 extends beyond torus 30 and can be used to view objects being gripped. Retracting rod 70 pulls camera 72 inside the torus protecting it while the torus picks up an object. Having the camera located at the center of the gripping area allows for easy control of the robotic gripper as it moves toward an object. Simplified computer control is possible because the camera is in-line with the gripper. No need to determine the distance to the object, because as long as the object is in the center of the camera's field of view, the gripper is automatically aligned with the object. A proximity sensor can also be added to the camera to automatically retract the camera when it nears the object to be picked up. A signal cable 68 is used to connect the camera electrically to a video connector 69. The path that cable 68 takes to the camera is not shown for clarity of the drawing, but can either run along the outside of control rod 70, or passing inside control rod 70 if hollow. Video connector 69 is in turn plugged into to video equipment for exporting the video signal from the camera.

The gripper is shown mounted to a solenoid assembly 77, comprising a solenoid 79, a center actuator 78, bracket 75 and connector 73. Connectors 28 and 76 on the gripper, snap fit into connector 73 and actuator 78 respectfully on the solenoid assembly. During operation, actuator 78 moves in-and-out of solenoid 79 along the symmetric axis (longitudinal axis) of control rod 70. A support bracket 75 is mounted to the exterior of solenoid 79 and provides a stationary mount for connector 73. Solenoid assembly 77 is easily mounted to standard robotic arms to provide positioning for the mechanical hand (gripper).

Preferred Embodiment with Modified Operation

In FIG. 8 we see an alternative design where a second torus 80 has been added to the preferred design seen in FIG. 1*a*. This second torus 80 fills central channel 34 of first torus 30, and control rod 38 is moved to the side between the interface of torus 80 and torus 30 (surfaces 34 and 82). Exterior surface 82 and central channel surfaces 34 are locked together by connector 39, making them move as a unit with control rod 38. Some of fluid material 31 is removed from torus 30 to make room for torus 80 which expands outward to press against channel surface 34. This places torus 80 coaxially within central channel portion 34 of torus 30 with the symmetric axises of the two tori substantially collinear with each other. Thus, the two tori are nested one inside the other to provide multiple gripping sizes in the same space as the original gripper. A third control rod 88 is added and attached to the central collapsed channel 85 on torus 80 with connector 89. This allows the center channel 85 of torus 80 to be controlled. Torus 80 can be extended out in front of torus 30 for use as shown in FIG. 8, or can be retracted completely inside channel 34 of torus 30. When extended as shown, torus 80 can be used as a separate gripper, allowing small objects to be grasped easily. With torus 80 completely retracted inside torus 30, the gripper can operate just like the gripper in FIG. 1*a*, picking up larger objects. Torus 80 can have a diameter up to nearly the same diameter of torus 30. At larger diameters, torus 80 acts as an expender, much like section 114 seen in FIGS. 10*a–b*, and can provide a cavity for zero reaction force gripping (zero "net force" applied to the object by the gripper).

In FIG. 9 we see an alternative gripper design where control panels 96*a* and 96*b* shape the exterior of torus 90. Torus 90 is similar to torus 30 seen in FIG. 1*a*, but with much less fluid material within it for its size. This reduction of fluid material inside torus 90 allows it to be shaped into a thin blanket with a long narrow gripping surface 95. The support structure for plates 96*a* and 96*b* is not shown in FIG. 9, but may comprise a simple housing that would hold the two plates with the proper spacing to keep the pressurized torus compressed between them. The plates also act as the exterior control rods and are bonded at least in one location to torus 90. Plate 98 is used as the central control rod and is bonded to torus 90 in center channel 94. Moving plate 98 with respect to plates 96*a* and 96*b* causes the gripping surface 95 to roll inward and pick-up objects. Torus 90 is longer than plates 96*a* and 96*b* so that the torus can bulge out on the back-side of the gripper. This bulge 97 at the rear is transferred to the front of the gripper as control plate 98 is extended to prepare to grip an object. This transfer of the bulge allows movement of the torus without significantly changing of the internal pressure of the torus' fluid. This aids in gripping, as the shape of end surface 95 can be adjusted depending on how far forward control plate 98 is extended. The further forward plate 98 is move the closer the front-end surface becomes to the round shaped end of the gripper in FIG. 1*a*.

In FIGS. 10*a&b* we see the gripper in FIGS. 1 through 6 with a different central control rod 110. Mounting bracket 111 and control rod shaft 112 are essentially the same as bracket 26 and control rod 38 in FIG. 1*a*. However, control rod 110 has a shaping tool 114 attached to the front end of shaft 112. Tool 114 has a diameter that is a significant percentage of the torus diameter. Shaping tool 114 effectively increases the diameter of the collapsed channel immediately adjacent to both ends of tool 114. When tool 114 is near front portion 36 of torus 30, the central channel is enlarged near the opening in the torus (see FIG. 10*a*). As tool 114 is retracted with respect to the torus, a cavity 115 is formed at the end of the torus which begins to close (see FIG. 10*b*) as tool 114 is retracted further. This cavity closes from the sides as surface 36 collapses inward radially (control rod 112 being retracted or control rod 40 is being extended). This allows grasping of objects from the sides with zero reaction force (a factor that may be useful in a weightless environment since no force is needed to push the object against the end of the torus for gripping). FIGS. 3*d* and 17, in section view, also shows a torus with an expanded channel.

The gripper in FIGS. 10*a*&b can have numerous additional functions added to the end of tool 114, such as, digital cameras, electromagnets, proximity sensors and others. In FIGS. 10*a&b*, contact sensor 116 is shown on the end of tool 114 and can detect contact with an object. Pressure sensor 116 is molded into a soft padding to protect delicate objects from damage during gripping. When an object contacts the sensor, a signal is sent to activate actuators (not shown) which in turn move control rods 40 and 112. Tool 114 can be modified in other ways such as shortening it to a very thin disk section. A disk is all that is needed to locally expand the central channel 34 (see expander 318 in FIG. 17), and may be sufficient for producing cavity 115 and for zero reaction grasping. If a deeper gripping cavity is desired, tool 114 can be shaped like a cup with the open end facing forward (outward). In other words, if tool 114 were a hollow cylinder, the cup may be made by removing the front portion of the cylinder where sensor 116 rests. With the front portion of tool 114 open, objects can drop into the cavity within 114 (either fully or partially depending on the depth of the cavity and the size of the object) and then have torus 30 close off the end by extending control rod 40. This effectively seals the object within the gripper without applying any forces to the object.

In FIG. 11 we see a mechanical use for the gripper on the end of a hand actuated control rod system. The gripper seen in FIGS. 1 through 6 is mounted on the end of actuating shafts 102 and 104. Mounting brackets 26 and 28 on the gripper snap fit into connectors 103 and 105 respectively on the actuators (see FIG. 1*a*). Obviously, control rods 38 and 40, can be combined with actuating shafts 102 and 104 respectfully to form a single unit if the gripper portion does not need to be removed from the system. Actuating shaft 102 is connected to finger trigger handle 106, and actuating shaft 104 is connected to grip 108. Spring 107 returns trigger 106 to its forward position after being pressed toward grip 108. Passage 109 holds actuating shaft 102 in line with actuating shaft 104 and provides a stable support when trigger 106 is being squeezed by a person's hand. In FIG. 11, actuating shaft 102 and trigger handle 106 are molded as a single piece of polymer plastic. Similarly, shaft 104 and grip 108 are also shown as a single injection molded piece of plastic. Alternatively, a manufactured design could build shafts 102 and 104 from tubular plastic that is welded to injection molded trigger 106 and grip 108 respectfully. This may make the design cheaper to manufacture. Note also that simply flipping the vertical position of connecting rods 38 and 40 so rod 40 is on top would grip 108 to connect directly to shaft 104 without the need for the bent intermediate section 99. By eliminating section 99 the handle can be made stronger with less plastic. A small loop of plastic connected to shaft 104 and supporting shaft 102 is all that would be needed to keep the two shafts aligned.

Roller-Drive Gripper Designs (FIGS. 12 through 15)

In FIGS. 12*a* through 12*e* we see a gripper with an elongated torus shaped membrane 120 being driven (actuated) by a roller assembly 130. Torus membrane 120 defines an interior volume filled with a fluid material 121 (i.e. a gas and/or liquid) and an exterior surface outside of the torus membrane facing away from the fluid material. Roller assembly 130 (for more detail see FIG. 15) comprises an inner assembly 134 and an outer assembly 136. When in use, outer roller assembly 136 may be mounted to a housing (not shown) which may be attachable to a robotic arm or other mechanical device. The construction of a roller housing for assembly 136 can take many shapes and the present art in this area is well advanced, therefore we will not discuss it at length here. Sufficient to say, that a basic housing, which supports the rollers and covers roller assembly 136 with a shroud, can easily be constructed and designed for attachment to any number of standard robotic arm fittings.

By using roller action instead of control rods for actuation, torus 120 can be rotated continually in one direction longitudinally around its interior volume. This allows objects to be picked-up continually and transported through the torus and out the back end. Torus 120 is of the same basic design as seen in FIGS. 1 through 9, but with rollers 126*a–d* (see FIG. 15) mounted inside the torus. These rollers press up against (forced against) the inside walls of the torus deforming it slightly, and forcing the torus material against outer roller assembly 136. On the outside of torus 120, rollers 122*a–d* and rollers 124*a–d* are positioned to allow rollers 126*a–d* to snap fit between them with the torus membrane pressed and trapped between the rollers. One or more of the rollers on exterior roller assembly 136 is driven by a motor and can move the torus membrane through fiction contact (see FIGS. 12*a–e*). Rollers 122*a–d* are positioned passed the end of torus 120 and at a diameter which is smaller than the torus diameter. This positioning of rollers 122*a–d* causes the torus to resist sliding backwards pass the rollers and gives the gripper a stable shape by keeping the torus on the forward side of the roller assembly 110. As with the control rod actuated designs, torus 120 is filled with a fluid material 121 that can be a gas, liquid, solid particles, or any combinations of the three. The use of air as the fluid along with a small amount of lubricant is the preferred combination because it makes the gripper very light-weight, but other combinations could work better in specific applications. FIG. 12*d* shows the roller gripper with an object 125 mid-way in collapsed channel 128 and the gripper has been rotated horizontal to align with a receiving structure (bin) 132. FIG. 12*e* shows object 125 exiting the rear of torus 120.

In FIG. 13 we see an elongated torus 140 which is very long to allow one end of the torus to remain stationary while the other end translates in 3-dimensions to grasp objects. Roller assembly 130 is the same roller assembly used in FIGS. 12*a–e*, and has at least one drive roller to drive torus 140. Roller assembly 130 is stationary in this design and is mounted to storage bin 132 (mounting means not shown). Mounted on the other end of torus 140 is a translatable roller assembly 150 which is unpowered (no drive rollers) in this example. Roller assembly 150 can include drive rollers to control the position of gripping surface 144, but for most needs it is unnecessary. If roller assemblies 150 has at least one drive roller to create motion of torus 140, then the drive roller system within roller assembly 130 could be eliminated. A small amount of lubricant 142 is put in with air 146 to reduce friction of the interior surface of torus 140 with itself. Lubricant 142 can be any lubricant that is compatible with the torus material, including, but not limited to, oil, graphite powder, synthetic oils, and other lubricants.

Translatable roller assembly 150 comprises an outer assembly 151 and an inner assembly 152. Outer assembly 151 comprises two sets of roller 156*a–b* and 158*a–b* that are attached together by a housing support (the housing support is not shown for clarity and can be similar to housing supports 172 seen in FIG. 15). Inner assembly 152 comprises two sets of rollers 154*a–b* and 155*a–b* connected by an extended housing support 157. Inner assembly 152 is sealed within torus 140 and outer assembly 151 is placed outside the torus. Roller 155*a* interacts with rollers 156*a* and 158*a* by compressing torus 140 between them. In the same way roller 155*b* interacts with rollers 156*b* and 158*b*. Rollers 154*a–b* are offset from rollers 155*a–b* by the extended portion of housing support 157. This offset extends the gripping surface 144 away from the outer roller assembly 151 so that assembly 151 does not interfere with the gripping process. The extended portion of support 157 and rollers 154*a–b* can be eliminated if the close proximity of the outer roller assembly will not interfere with grasping. In this case gripping surface 144 would tend to slide up toward rollers 155*a–b* due to the pull on the center channel portion of torus 140 by the drive rollers on assembly 130. A housing (not shown) on roller assembly 151 could be attached to a robotic arm so that its gripping end 144 can be moved to a large number of locations for gripping objects. In this example, roller assembly 150 only has two sets of rollers an "a" side (rollers 154*a*, 155*a*, 156*a* and 158*a*) and a "b" side (rollers 154*b*, 155*b*, 156*b* and 158*b*) to show how just two rollers are possible. In general, rollers on four sides would be more effective and would form a complete ring of rollers similar to that seen in FIG. 15 to reduce wear due to friction.

FIG. 14 shows the gripper in FIGS. 12*a–e* with an additional tool assembly 160 attached to the roller assembly 130. Many different tools can be added to the basic gripper design, such as cutters, additional gripping elements, saws, etc. In FIG. 14, tool assembly 160 is comprised of support arms 162*a–b*, and tools 161*a* and 161*b*. Tools 161*a–b* in turn comprises actuators 164*a–b*, shafts 166*a–b*, and bumpers 168*a–b* respectfully. This tool represents one of many possible tools that could be attached to the basic gripper design. Support arms 162*a* and 162*b* connect to the roller assembly 130 and/or mounting bracket 220 to provide a stiff mounting surface for actuators 161*a* and 161*b* respectfully. Each actuator has a solenoid 164*a–b* respectfully, which drives a shaft 166*a–b* connected to a rubber bumper 168*a–b* respectfully. The solenoids 164*a* and 164*b* are activated electronically and push bumpers 168*a* and 168*b* together to interact with objects. Bumpers 168*a* and 168*b* can be any size and shape needed to provide the gripping needed and could also be replaced with cutting tools to provide a cutting function.

FIG. 14 also shows one way roller assembly 130 can be attached to other systems. Mounting bracket 220 comprises main body 226, bolt bracket 224, and bolt bracket 222. The main bracket body 226 is bolted or welded onto roller assembly 130 to support both roller assembly 130 and tool assembly 160. In this design only bracket 224 is used to bolt the gripper to bin 132 with bolt 228. For use on a robotic arm, bracket 222 can be used to bolt the gripper to the end of the mechanical arm (robotic arm). The robotic arm may then provide pneumatic, hydraulic, electrical and/or mechanical power to rollers on assembly 130 and to the actuators on tool 160.

In FIG. 15 we see an exploded view of roller assembly 130 as shown in FIGS. 12 through 14. The assembly comprises two parts, an inner roller assembly 134 and an outer roller assembly 136. Inner assembly 134 is constructed with an annular housing 172 supporting four rollers 126*a–d* mounted on it. Rollers 126*a–d* are free to rotate on housing 172. Outer assembly 136 is more complex with rollers 124*a–d* supported by annular housing 174 and rollers 122*a–d* supported by annular housing 173. Annular housings 173 and 174 are connected into a single unit by four connector segments 178 spaced around the assembly. The outside diameter spacing of roller assembly 134 is designed to approximately match the inside diameter of the torus it is inserted in. The inside diameter spacing of the rollers 124*a–d* are designed to be slightly smaller than the outside diameter spacing of rollers 126*a–d* plus the thickness of the torus membrane. Rollers 122*a–d* have an inside diameter roller spacing significantly smaller than the outside diameter roller spacing of assembly 134, thus rollers 122*a–d* trap roller assembly 134 between themselves and rollers 124*a–d* respectfully. This means that rollers 126*a–d* can snap passed rollers 124*a–d* and be held in place by rollers 122*a–d* with the torus trapped between. Rollers 122*a–d* also resists the rear portion of the torus from slipping back passed them because of their smaller annular diameter. Stepper motors 170*a* and 170*c* drive rollers 122*a* and 122*c* through shafts 179*a* and 179*c* respectfully. When mounted to a torus, both drive rollers work together to move the outer surface of the torus in either direction. When rotated as shown by arrows 177*a* and 177*c*, the exterior of the torus would move forward while the collapsed channel would move backward toward the roller assemblies. Arrows 177*a* and 177*c* show the standard direction of rotation for grasping objects and transporting that object through the torus channel. Reversing the direction of the drive rollers would cause objects within the torus channel to be moved back toward the front of the torus.

In FIG. 16*a* we see an elongated torus 190 driven by two identical roller drive assemblies 194, which are similar in design to roller assembly 136 seen in FIG. 15 and are comprised of smaller diameter rollers 196*a–d*, larger diameter rollers 197*a–d* (note only a and c rollers shown) and mounting bracket 195. Roller assemblies 194 also include drive motors and support structure similar to FIG. 15, but are cut away in this drawing. Additionally, an inner roller assembly similar to roller assembly 134 can be used inside torus 190, but proper positioning of roller assemblies 194 can keep torus 190 trapped between them and in proper contact with the rollers to impart motion. Torus 190 is pressurized with fluid 191, to provide a semi-rigid shape to the torus, and help support objects as they move through the torus. Roller assemblies 194 are mounted with brackets 195 so that torus 190 is trapped between them. Multiple passive roller assemblies 192, consisting of two or more guide rollers (only rollers 202*a* and 202*c* shown) on an annular housing (not shown), and mounting bracket 198. Roller assembly 192 thus forms a ring shaped support around torus 190. Roller assemblies 192 are positioned so they provide smooth flow of torus membrane 190 from one end of the torus to the other. Roller assemblies 192 also help support the torus as it rotates and also directs the path the torus takes. For a torus of very long length, many passive roller assemblies may be used to prevent kinking or unwanted binding of the torus.

In FIG. 16*a* objects 125 are transported by the torus, and are securely gripped while being transported. The surrounding gripping action of the torus allows objects to be moved in any direction the torus may go. Object 125 is shown within collapsed channel 193 and also another similar object 125 existing torus 190. Notice that for a long torus many objects can be transported simultaneously. Torus 190 can grip and transport objects through its center channel 193 (collapsed channel 193 of torus 190) just like the grippers in FIGS. 12 through 14. However, for this design the gripper is stationary and mounted to a wall or post with brackets 195 and 198, which fix roller assemblies 194 and 192 in place respectfully.

This type of conveyer would work well in vertical applications as shown in FIG. 16*b*, where a normal conveyer would potentially drop the object or not be able to lift the object at all. In FIG. 16*b* the top end of torus 190*a* is left unobstructed, that is, no roller assembly 194 is mounted on the top end of torus 190*a*. An inner roller assembly similar to assembly 134 could also be placed above assembly 192 to prevent the top portion of torus 190*a* from slipping downward. The weight of torus 190*a* keeps it in position as it rests on roller assembly 194 (not seen) at the bottom of torus 190*a*. With the top portion of the conveyer (torus 190*a*) open, a second conveyer assembly of similar design could be mounted directly above the unobstructed end of torus 190*a*. With proper spacing of the ends, objects can either be stopped at the end of torus 190*a*, or gripped by the upper conveyer (torus 190*b*) and continue to be transported upward. In this way, the vertical conveyer can pass objects from the lower torus 190*a* to the upper torus 190*b* or from upper torus 190*b* to lower torus 190*a*. With proper computer control, a user could simply push a button for the person or floor they want to send an object to and then let the conveyer simply move it to them. Objects would automatically be grasped and moved by the torus when placed in contact with the gripper end, and then whisk away, jumping from one conveyer to another until it gets to its destination. Photo sensor 200 is used to track the object by detecting when an object is between torus 190*a* and 190*b*. When object 125 reaches its destination and is detected (object 125, for example, blocks a light source detected by sensor 200), it is stopped inbetween torus 190*a* and 190*b*. The user can then see object 125 resting between the two torus and simply pull it out. Since torus 190*a* is unobstructed by rollers, the user can easily deform torus 190*a* to allow easy removal of the object.

In FIG. 17 we see an alternative design for a mechanical gripper 300 similar to gripper designs see in FIGS. 1 through 8. Gripper 300 comprises, a torus 301, and two control rods 302 and 304 with linear gear tooth strips 308 and 306 respectfully. Gear strips 308 and 306 are integral with control rods 302 and 304. Gear 310 is driven by a stepper motor (or other controllable motor), and meshes with gear strips 308 and 306 on control rods 302 and 304 respectfully. This design shows one alternative to using linear actuators to drive a torus gripper. By having control rods 302 and 304 act as both linear actuator and control means a simple rotary motion can provide the needed linear movement. Expander 318 on the end of control rod 304 expands the central torus channel adjacent to expander 318, and to create cavity 317 near the end of torus 301 for gripping objects without a reaction force.

Operational Description—FIGS. 2 Through 6

The preferred embodiment shown in FIGS. 1 through 6 has at least five distinct modes of operation when grasping an object. FIGS. 2 through 6 show these five modes as they grasp an object. We will look at them one at a time.

MODE 1 (FIGS. 2*a* Through 2*d*)

Figures 2A, 2B, 2C, 2D:
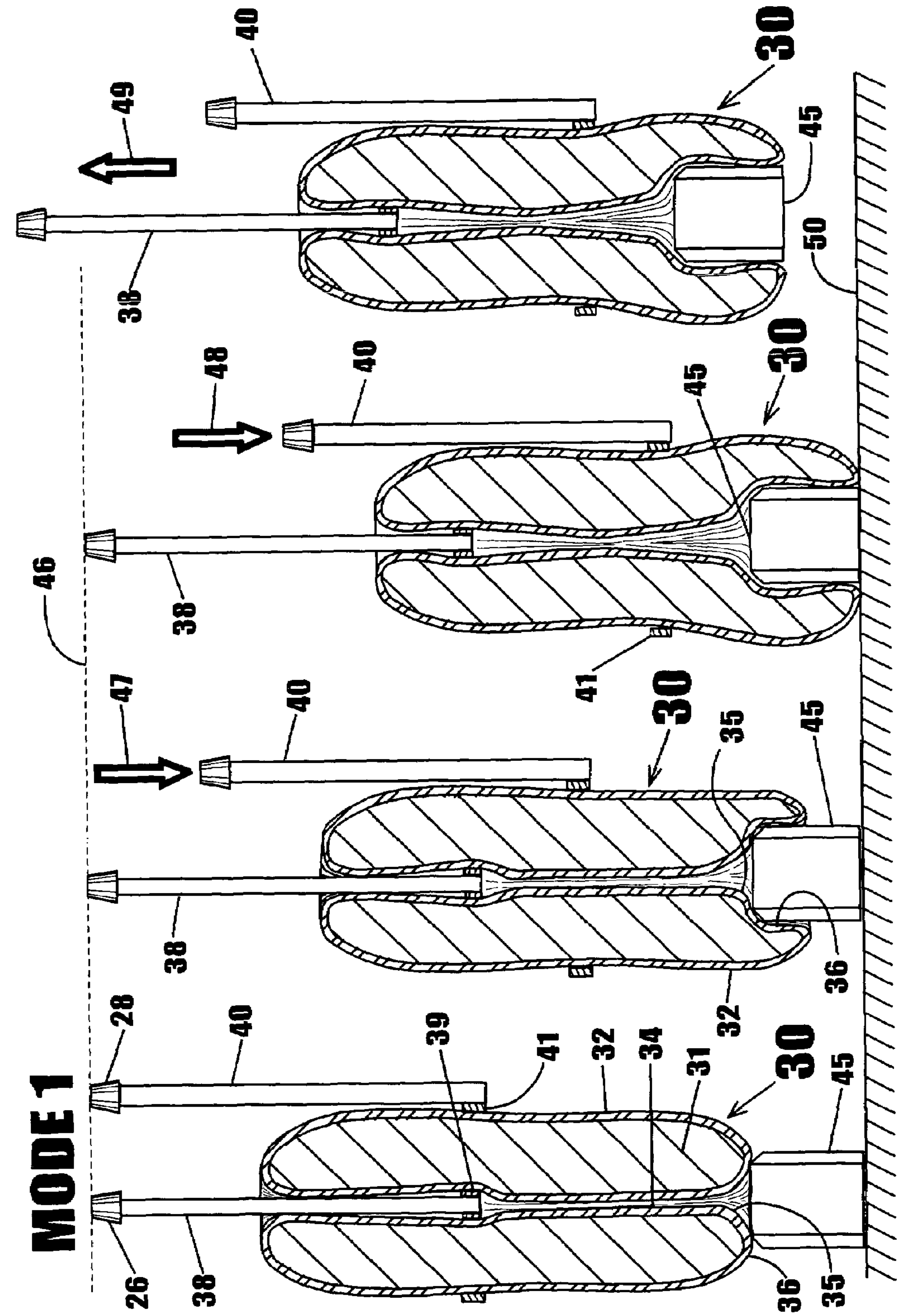

This mode is the standard and surest way of grasping an object. In this mode the gripper's contact surface moves around the object without actually moving the object. Reference line 46 shows how control rod 38 remains stationary during the grasping process. In FIGS. 2*a* through 2*c* we see the robotic gripper at different stages of grasping object 45, with FIG. 2*d* showing the object being carried away. In FIG. 2*a* the gripper is positioned to grasp the object, with the torus's longitudinal axis (symmetric axis) centered on the object with front section 36 of the torus near object 45, but not necessarily touching it. (Exact positioning of the torus is not necessary, since the torus can deform to grasp the object. Even drastic misalignment of the torus along all three axis will still not prevent the torus from gripping the object. The radial sliding motion of end 36 tends to move the object in alignment with center channel 34 so that it can be picked-up.) After gripping end 36 is placed near object 45, control rod 40 is moved down toward the object while control rod 38 remains stationary. This causes torus 30 to physically move toward the object and make contact. The torus forces itself down on object 45, and surface 50 provides the reaction force needed to hold the object in place as control rod 40 continues to move downward. As seen in FIG. 2*b* this motion 47 causes the outer surface 32 of torus 30 to move downward and front surface 36 to roll against the sides object 45. In FIG. 2*b*, the gripper has sufficient grip on object 45 to lift it even if object 45 is quite heavy. However, control rod 40 can continue to be moved down toward the object with motion 48 to grip the object even better as seen in FIG. 2*c*. Fluid pressure within the torus, forces surface 36 against object 45 from all sides so that friction between the torus and the object generates the gripping force to hold onto the object. FIG. 2*d* shows object 45 lifted away by moving both control rods 38 and 40 as a unit in the same direction as show by arrow 49. Notice that control rod 40 can be moved even further toward the object to cause the object to be completely surrounded by torus 30 (see FIG. 3*d*). In this completely surrounded state, gripping is provided by the mechanical position of the torus and friction plays only a minor roll in holding on to the object.

MODE 2 (FIGS. 3*a* Through 3*d*)

Figures 3A, 3B, 3C, 3D:
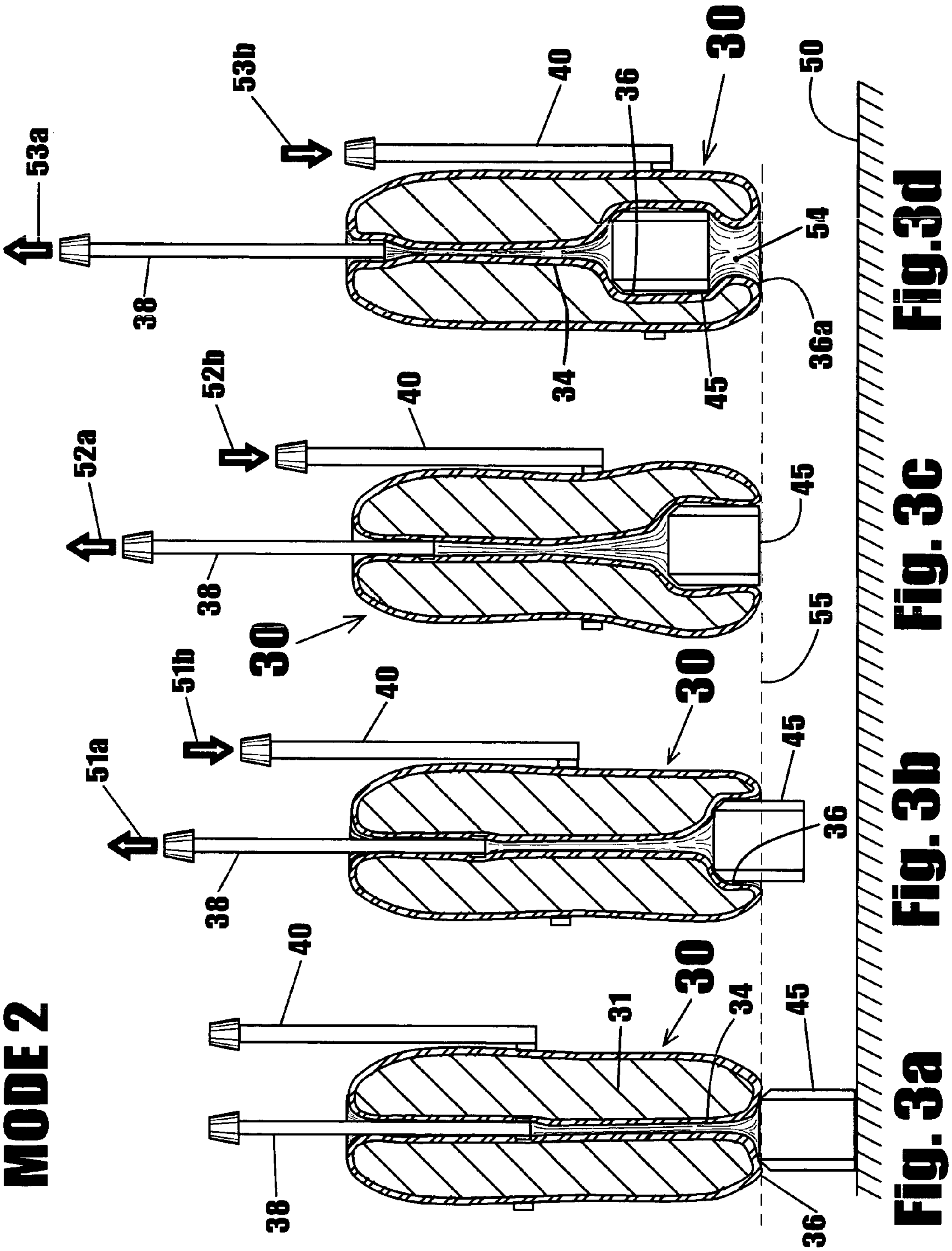

This mode of grasping is less sure than MODE 1, and operates by pulling the object into the torus while the torus position remains stationary. In FIG. 3*a* we see the starting position with the front portion 36 of torus 30 pressed against object 45. Unlike MODE 1, this second mode requires the torus to be in contact with the object before attempting to grasp it. As control rods 38 and 40 are moved in opposite directions at equal rates, the torus surface rolls about its interior volume without the torus as a whole changing its position. Reference line 55 shows the static position of the torus with respect to surface 50. The front portion 36 of the torus slides radially inward against the object and tends to pull the object into central channel 34 as shown in FIG. 3*b*. Even if the object is not at first aligned with central channel 34, the radial sliding motion of surface 36 tends to draw (or pull) the object to the center of the torus where it can be pulled into the channel 34 by surface friction. Because interior channel 34 is moving upward, the object is also moved upward according to the movement 51*a* of control rod 38. Control rod movements 51*a* and 51*b* for this mode are equal and opposite. In FIG. 3*c*, we see that if control rods 38 and 40 continue to be moved as arrows 52*a* and 52*b* show, object 45 is pulled further inside the collapsed channel while at the same time being lifted further from surface 50. With further movement of control rods 38 and 40 the object can be surrounded by torus 30 as shown in FIG. 3*d*. With further movement of control rods 38 and 40, object 45 can be completely enclosed within torus 30 with virtually no chance that the object can be accidentally released. This completely enclosed state provides the object with very good protected from damage by the cushioning effect of the inflated torus surrounding it. Notice that a new gripping surface 36*a* is now ready to grip another object (provided the torus could be rotated further). Also notice that cavity 54 has been created by the position of object 45 within torus 30. This cavity can also be used to grip another object. In the position shown in FIG. 3*d*, both control rods 38 and 40 are at the extent of their range. Note however, that if before grasping object 45, control rods 38 and 40 were moved to their full extent, with control rod 38 fully down nearer object 45, and control rod 40 fully up, the control rods would have about twice the range of motion shown in FIGS. 3*a*–*d*. This additional range would allow other objects to be picked up at the same time. As we will see later, increasing the length of the torus will allow additional room to pick-up multiple objects at one time.

To release the object in FIGS. 3*a*–*d*, the control rods can be simply moved to their original alignment (control rods 38 and 40 even with each other). When this happens the object is moved back toward the front of the torus until it is completely expelled from the central channel.

Combination of MODE 1 and MODE 2

It should be noted that there are many intermediate levels between MODE 1 and MODE 2 where a combination of the two is used. This happens when control rod 40 is moved more toward the object than control rod 38 is moved away from the object. The result of this is that the torus creeps slowly toward the object depending on the differential movement of the control rods. With just slightly more movement of rod 40 than rod 38, the gripper can move toward the object as it grips while at the same time lifting the object off surface 50. This mix of modes 1 and 2 assures positive gripping of the object on a surface while also reducing the interaction of the gripper with surface 50 by removing the object as quickly as possible from the surface. It also does not require the torus to be in contact with the object before moving the control rods to pick up the object, since the torus moves toward the object as it performs the grasp.

MODE 3 (FIGS. 4*a* Through 4*c*)

In this mode, only the center control rod 38 is moved to grasp object 45. Reference line 60 shows how outer control rod 40 remains stationary in this mode. For this mode front portion 36 of torus 30 must be deformed slightly against the object in order to grip it. This mode of gripping is less sure than either MODE 1 or MODE 2 because the torus actually moves away from the object as it grips it. This means it must have sufficient grip on the object before it is lifted off the top surface of the object. In actual practice, torus 30 need only be pressed slightly against object 45 in FIG. 4*a* in order to grip it. The greater the deformation of torus 30 on the object the more likely it is to grasp it properly. FIGS. 4*b* and 4*c* show the object being pulled further into the torus. Notice that the object moves up and away from surface 50 at the same rate as control rod 38 is moved away from surface 50.

Combination of MODE 2 and MODE 3

There is also a range of modes between MODE 2 and MODE 3 where the movement of control rod 38 is greater in magnitude than the movement for control rod 40 and in the opposite direction. The greater the magnitude of movement of rod 38 with respect to control rod 40, the faster the torus is moved away from the object being grasped. This means, that for the range of movements between MODE 2 and MODE 3 the object must be grasped in the first small movements of the torus, otherwise the object will not be grasped. In general, the slower the torus moves away from the object (greater the movement of control rod 40 downward) the more likely the object will be grasped. Once grasped, the object is securely pulled inside the torus just like the other modes.

MODE 4 (FIGS. 5*a* Through 5*c*, 8, 10*a* and 10*b*)

In this fourth mode of operation the gripper is used to grip a freely floating object such as a ball flying though the air, an object floating in space, or a piece of fruit hanging on a limp branch. In each of these cases, there is no surface with which to press the object against to create a contact force between the object and the gripper (net force on object is near zero). There are two ways to deal with this situation:

- you can accelerate the object to create the force (force=mass times acceleration) as is done in FIGS. 5*a* through 5*c*, or
- grasp the objects from the sides by expanding the central channel as seen in FIGS. 10*a* and 10*b*. We discuss both these cases below.

If an expander does not alter the normal shape of the torus end 36, a contact force (or reaction force) is needed to allow most objects to be gripped. Without this force pushing front portion 36 of the torus membrane against object 45, the torus must grab the object by surface friction alone. Smaller objects are grabbed more easily than larger ones with this method, since the angle of the surfaces on portion 36 becomes more acute as it nears the collapsed channel 34. If the object is large enough it will encounter a flat surface (contact angle 90 degrees) where an infinite coefficient of friction may be needed to grab the object. To grab larger objects by this method, the momentum of the object (acceleration) is used to push the object against the torus membrane just long enough to get the membrane to grip it. To do this, the torus as a whole must move toward the object as the torus rotates about its central fluid material 31. Simply moving control rod 38 forward will accomplish this movement. However, in many cases this will not be sufficient and an overall translation of the gripper is needed as shown in FIG. 5*a* and reference line 66. To obtain this overall translation, the gripper can be mounted to a robotic arm (not shown) which then provides control of rods 38 and 40. The movements 61 and 62 of the control rods shown in FIG. 5*a* can be thought of as the sum of the robotic arm movement plus that of the gripper control rods. If movement 61 represented the movement of the robot arm, then control rod

38 would be stationary with respect to the end of the robot arm. For this case, the actuation of the gripper may be the same as that shown in FIGS. 2*a* through 2*c*, where control rod 40 is simply moved forward with respect to the robot arm. Just before impact, as seen in FIG. 5*a*, outside control rod 40 is moved forward with respect to control rod 38 giving it slightly faster closing speed with object 45 than control rod 38. The impact of the object with the torus presses the object into the torus and deforms end portion 36 as the object is accelerated by the pressure. The differential movement of the two control rods (rod 40 moved forward with respect to rod 38) causes the torus to rotate and grasp the object as shown in FIG. 5*b*. This gripping action occurs before the object has time to rebound off the torus membrane surface. Once grasped as in FIG. 5*b*, movement of rod 40 continues forward to wrap the torus membrane around the object to securely grasp it. The gripping ability of this mode can be greatly increased by reducing the pressure of fluid material 31 within torus 30. As pressure is reduced the end of the torus becomes less and less springy to impacts with objects. This gives the gripper more time to rotate and grab the object. As fluid pressure is dropped to atmospheric the torus membrane becomes limp and an object impacting the torus sinks deep into the surface allowing gripping of objects with less impact force.

The addition of an expanding section in the torus's central collapsed channel (as seen in FIGS. 8 and 10*a–b*) allows larger object to make more acute angles with the torus or even to fit within the cavity created by the expander sections 114 in FIGS. 10*a–b* and second torus 80 in FIG. 8. The grasping ability is greatly improved by the addition of an expander because it can create a cavity or pocket at the end of the torus to allow the torus to close around the object from the sides with little or no impact force. The torus can even close from behind the object if the object is short enough and the expander is the proper size. With this method, contact angles less than zero degrees are possible, which means, no friction is needed between the object and the torus to grab an object. This provides many applications where high-friction coefficients are not possible between the object and the torus.

MODE 5 (FIGS. 6*a* Through 6*c*)

This final mode of grasping is quite different from the previous four modes in that the exterior of the torus is used to grip the object instead of the central channel. During this process, control rod 40 remains stationary as shown by imaginary line 67. The gripper in this case is used to grip the interior surface of a cavity on an object instead of its exterior. FIG. 6*a* shows the gripper in position to grip object 65. Central control rod 38 is moved down toward the object with motion 71 in FIG. 6*b*, and elongated torus 30 rolls toward the object making contact with it and forcing its way into the cavity on object 65. The torus can pull its way into cavities as small as about one-half its diameter. The actual minimum cavity diameter depends on a complex relationship between the coefficient of friction of the object and the torus, the elasticity of the torus membrane material, the force applied to the torus, and the fluid pressure inside the torus. Torus 30 can also be made to grip the inside of cavities larger than its diameter by expanding as it compresses itself against the bottom of the cavity and then expanding against the walls of the cavity. Notice that torus membrane portion 36 is the portion used to make first contact to grip the object in the other four modes, however, in this case the torus is rotated in the opposite direction and moves outward instead of inward to grip the object. The torus presses outward onto the walls of the cavity on object 65 and grips it tightly. FIG. 6*c* shows control rod 38 continuing forward, and forcing the torus to crawl further into the cavity on object 65. As the torus is forced into a cavity, the smaller size of the cavity compresses that end of the torus and increases the fluid pressure inside the torus. The amount of pressure increase depends on the elasticity of the torus membrane and the size of the cavity it is gripping. For cavities significantly smaller than the diameter of the torus, considerable downward force on the object is requires to get the end of the torus inside. However, if the cavity diameter is just slightly smaller than the torus diameter the torus will readily grab hold of the object and allow it to be lifted. This interior mode of gripping action can duplicate operational MODES 1 through 4, only with the movements of control rods 38 and 40 reversed. The gripping action shown in FIGS. 6*a* through 6*c* would correspond to MODE 1 shown in FIGS. 2*a* through 2*d*, where the torus moves toward the object as it grips it.

In FIG. 7 we see an example of a torus connected to a solenoid actuator 77. Control rods 40 and 70 snap into connectors 73 and 78 respectively to attach the gripper to solenoid actuator 77. Solenoid 79 moves connector 78 in and out along the axis of the control rods to cause differential movement between control rods 40 and 70. This differential movement is along the longitudinal axis of the control rods (symmetric axis of torus 30) and creates a longitudinal rotation of the torus membrane around its interior volume. Control rod 40 is held stationary with respect to the outer portion of solenoid 79 by bracket 75. Thus, only control rod 70 is actuated by the solenoid. As solenoid connector 78 is pulled into the solenoid, control rod 70 also moves backward and camera 72 is pulled inside torus 30. As the solenoid continues to pull control rod 70 backward, the front surface of the torus (near camera 72) slides inward radially to provide a gripping motion that tends to pull objects into central channel 34. This motion actually causes torus 30 to move backward at one-half the rate that control rod 70 does, thus the torus tends to move away from an object being picked up (this action corresponds to MODE 3, see FIGS. 4*a–c*). If solenoid 79 were reversed and placed on control rod 40 instead, the torus would move toward the object with the solenoid moving control rod 40 forward to create the same radial sliding motion on the front of torus 30 (this action corresponds to MODE 1, see FIGS. 2*a–d*). Finally, if two solenoids were used, one on control rod 70 pulling backward, and one on control arm 40 pushing forward, the net effect on the torus would be that it remains in the same location during gripping while rotated about its internal volume (exterior portion 32 sliding in equal and opposite direction to interior central channel 34—this action corresponds to MODE 2 see FIGS. 3*a–d*). This two-solenoid design could very quickly grab objects by simply coming in contact with the front of the torus and then activating both solenoids. With proper solenoid control any of the five MODES shown in FIG. 2 through FIG. 6 can be generated.

Multiple Object Gripping

All of the modes above can be used to pick up more than one object (MODE 5 picking up multiple ring-shaped objects). Multiple objects can be grasped one at a time, or a whole pile of objects can be grabbed from a single location. For picking up separately spaced objects, one may grab the first object and then pull it inside the torus as seen in FIG. 3*d*. Once object 45 is inside torus 30, surface 36*a* is free to grab another object. Note however, that the torus in FIG. 3*d* is nearing its full range of motion. If torus 30 was made longer, several objects could be picked-up at the same time.

F or a pile of objects such as a pile of bolts and nuts, or a pile of coins, Mode 1 or a combination of Modes 1 and 2 may be most effective because the gripping end stays relatively stationary as it grips. If a pile of coins were being picked up, the torus would be moved into position and control rod 40 moved downward and control rod 38 upward. The radial sliding action of surface 36 moves the top layer of coins in contact with the torus toward the central symmetric axis, and up into channel 34. As this top layer of coins are removed, a new layer of coins are exposed and are moved in the same way toward and into channel 34. This process continues until all the coins are picked up or the full range of motion of control rods 38 and 40 is reached. Inside the torus, the coins form a string along collapsed channel 34. These coins can then generally be released one-at-a-time by reversing the motion of the control rods.

Operation of Nested Torus Gripper—FIG. 8

In FIG. 8 we see a nested gripper, where one torus is placed within another to provide two gripping surfaces 36 and 86. The advantage of having multiple torus levels is that good gripping can be achieved over a wide range of sizes by a single gripper. Best gripping (without a central shaping section, see tool 114 in FIGS. 10*a–b*) generally occurs when the object being gripped is between 10% and 60% the diameter of the torus doing the grasping. Thus, having a number of different sized torus diameters allows better overall gripping of many different sized objects. Nested torus 82 can also act as a shaping section, much like tool 114 in FIGS. 10*a–b*. We see in FIG. 8 that inner torus 80 expands channel 34 of outer torus 30. As torus 80 is pulled inside torus 30 a cavity remains in central channel 34 near the front end of torus 80. This cavity when near the front end of torus 30 (see surface 36), allows objects to be partially surrounded by torus 30 before the gripping process begins. This allows objects to be gripped without the need to be pressed against the end of the torus. The number of torus levels that can be nested is only limited by the amount of space available for the gripper. The radial thickness of each torus layer can be quite small, having a thickness only slightly thicker than the two layers of the torus membrane forming it. In realistic terms, 3 or 4 nested torus levels is more than sufficient for most uses. As more nested torus layers are added, the operation of the gripper gets more complicated, but the actual operation of each individual torus can remain essentially the same as a single torus. For example, torus 80 in FIG. 8 is controlled by control rods 88 and 38, with control rod 88 acting as the central control rod, and control rod 38 acting as the exterior control rod. If torus 30 does not get in the way (torus 80 extended out in front of torus 30), torus 80 can operate as if torus 30 was not even there. The same is true for torus 30 being controlled by control rod 38 and 40. Control rod 38, in this case, would act as the central control rod, and control rod 40 would act as the exterior control rod. If torus 80 is retracted far enough within torus 30 so that it does not interfere, torus 30 can operate as if it were along, like the gripper in FIG. 1*a*. Further, if torus 80 is stopped near surface 36 on torus 30, it can act as an expander (see FIGS. 10*a–b*) to provide a cavity on the end of torus 30 for better gripping and/or for zero reaction force gripping. The complexity of controlling a multiple torus gripper becomes obvious when one considers that control rod 38 acts as the exterior control rod on torus 80 and the central control rod on torus 30 at the same time. Thus, moving control rod 38 effects both torus 30 and torus 80 at the same time. As control rod 38 is moved, its action is transferred to both collapsed surface 34 of torus 30 and external surface 82 of torus 80 through connector 39. The surfaces 34 and 82 act like a single layer because of pressure and friction holding them together, thus as control rod 38 moves, surfaces 34 and 82 move with it.

For the two-torus design as seen in FIG. 8, moving only control rod 38, would rotate torus 30 in one direction while rotating torus 80 in the other direction. Thus, one torus may be grasping while the other was releasing. Both could be made to grasp at the same time by retracting control rod 88 faster than control rod 38. This would result in a relative motion between rods 88 and 38 which would causes front surface 86 to rotate into the collapsed center channel 85 while torus 80 would be pulled into the center channel of torus 30. Many other combinations for moving the three control rods exist and even greater numbers of combinations exist if a three torus design was used (for example, placing a third torus between torus 80 and torus 30). Each torus added would also require another control rod so that all surfaces are being controlled. To simplify things on multi-torus grippers, some of the control rods can be connected together to form a single movable unit. This allows different surfaces within the nested gripper to be easily moved together. We could discuss these multi torus designs with more than two torus grippers, but the movement of these surfaces, and combination of moving surfaces, are straight forward and should not require further discussion.

Operation of Shape-Modified Torus Grippers—FIGS. 9 and 10

The operation of the gripper in FIG. 9 is exactly the same as the gripper in FIG. 1*a* except plates 96*a* and 96*b* act as the exterior control rods and plate 98 act as the center control rod. Torus 90 could be exactly the same as torus 30, but with much less fluid material within it so that it can be flattened between plates 96*a* and 96*b*. These plates simply act as a mold to hold the torus in this flattened condition. When plate 98 is extended, the front surface 95 extends further beyond the front of plates 96*a* and 96*b*. When this happens the torus can begin to loose its flattened shape and bulges outward to a fully circular shape at sufficient distance from the plates, as is partially shown by the bulging section 97 at the rear of torus 90. To keep pressure of the fluid constant within torus 90, the torus should extend sufficiently beyond the ends of plates 96*a* and 96*b* (at end 97) so that during normal operation the torus is not fully pushed into the space between the plates. Thus, as control plate 98 is moved forward, the fluid material in the backside of the torus flows to the front of the torus to fill the expanding volume there. This particular design is only an example of how the general elongated torus can be molded into other shapes for specific purposes. Control plates of many shapes are possible, and this example should be sufficient to disclose the concept of shaping the torus with exterior plates. FIGS. 10*a–b* discussed next show yet another way the torus can be reshaped to provide gripping for specific situations.

In FIGS. 10*a&b* we see the modified gripper with a tool 114 on the central control rod 112. This tool 114 is designed to reshape torus 30 by expanding and reshaping the collapsed central channel 34 and allow the creation of a cavity 115 for gripping objects with little or no insertion force (reaction force). When in operation, the gripper in the state shown in FIG. 10*a*, is positioned in front of an object such as a strawberry on a vine (not shown). When the object comes in contact with pad sensor 116, control rod 40 is moved forward by computer control. Because the central channel 34 has been expanded by tool 114 the end of the torus forms a large depression (cavity) as torus 30 moves forward and around the object. As rod 40 continues to move forward, the cavity extends further forward and section 36 of the torus membrane collapses from the sides as shown in FIG. 10*b*. Thus, an object (such as a strawberry) is gripped from the sides directly not by sliding surfaces. This allows a gripping angle of nearly 90 degrees, so that even very low surface-friction between the object and the torus still allows gripping of the object. Such gripping is done with little or no insertion force needed to hold the object in place while surface 36 collapses around it. This means that the strawberry on the vine is not pushed away as control rod 40 moves forward, but instead, torus 30 actually wrap around the strawberry from the sides as it hangs from the vine. FIG. 10*b* shows what this cavity 115 may look like in a partially collapsed state (also see FIG. 17 where torus cavity 317 is shown in section partially collapsed). Without an object in cavity 115, the cavity will collapse to about one-half the diameter of shaping tool 114 when the torus 30 extends approximately one diameter beyond the front of tool 114. Thus, objects about the diameter of tool 114, or smaller, can be gripped from the sides or even from behind (behind meaning the torus closes on the object from the sides of the object facing away from tool 114). Very small objects would be forced against sensor 116 as torus 30 closes behind it. Notice that an object within the central channel can also create a cavity as seen in FIG. 3*d*, with cavity 54 generated by object 45 within channel 34.

Operation of Hand Actuated Gripper—FIG. 11

FIG. 11 shows a hand operated gripper using the gripper shown in FIGS. 1 through 6. Control rods 38 and 40 snap into connectors 103 and 105 respectfully and allow torus 30 to be easily removed for replacement. Connectors 103 and 105 are actuated by shafts 102 and 104 respectfully. In operation the user may grab the device by the handle grip comprising rear grip 108 and trigger handle 106. When the user wants to grip an object they simply place end 36 of torus 30 against the object and squeeze trigger handle 106 back toward grip 108. Channel 109 acts as a guide for shaft 102, to keep the two shafts 102 and 104 aligned, and also to keep trigger 106 and grip 108 aligned during use. As trigger 106 is squeezed shaft 102 moves backward with respect to shaft 104 which causes control rod 38 to move backward with respect to control rod 40. This causes torus 30 to slide backward along its centerline and moving surface 36 radially inward toward the center channel. The object in contact with surface 36 is pulled into the channel by this sliding motion and gripped. The user can now move the object around while holding trigger handle 106 against grip 108. To release the object, the user simply relaxes their grip on trigger 106 and spring 107 pushes trigger 106 forward and away from grip 108. This causes torus 30 to return to its original position by sliding the center channel forward with respect to control rod 40. The object being held in this channel is thus forced out by this sliding action and released. This operation is exactly the same as if an electric or hydraulic actuator was used to move shafts 102 and 104 with respect to each other. The use of the human hand as the actuation device is a special application of the gripper. Normally, the gripper would be actuated by other actuating means, such as, stepper motors, solenoids, hydraulics, pneumatics, worm gear motors, roller action, and others.

Operation of Roller-Driven Torus Grippers—FIGS. 12 Through 16

The basic gripping action of the torus is a result of the rotation of the torus membrane around its internal volume and more specifically by the radial sliding motion of the gripping end of the torus. This radial motion is easily achieved by the use of control rods, but because the control rods are attached directly to the torus, they can only move the length of the torus before they must stop. This problem is eliminated with the use of drive-rollers that allow the torus to be rotated in a one direction indefinitely.

Figures 12A, 12B, 12C:
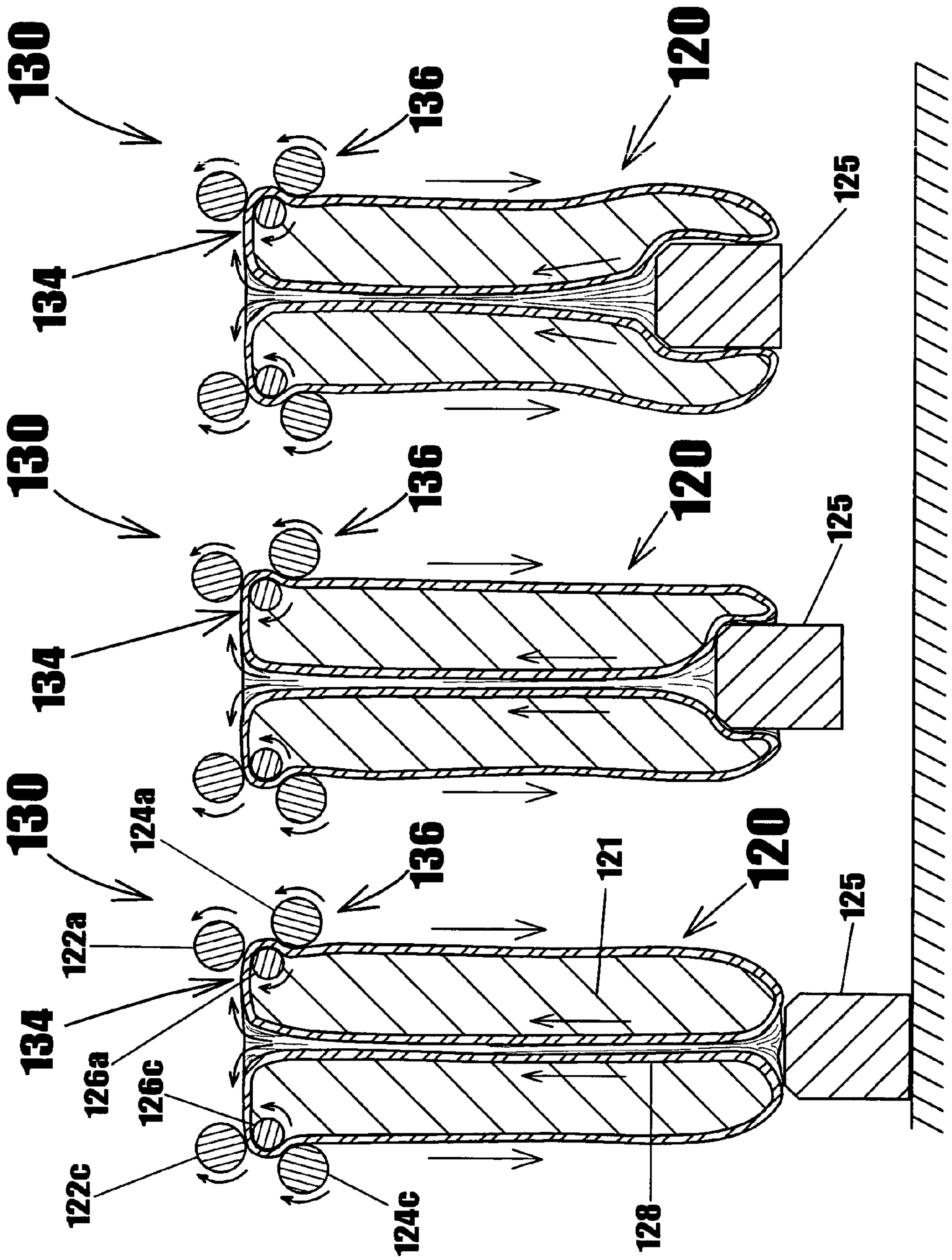
Figure 12D:
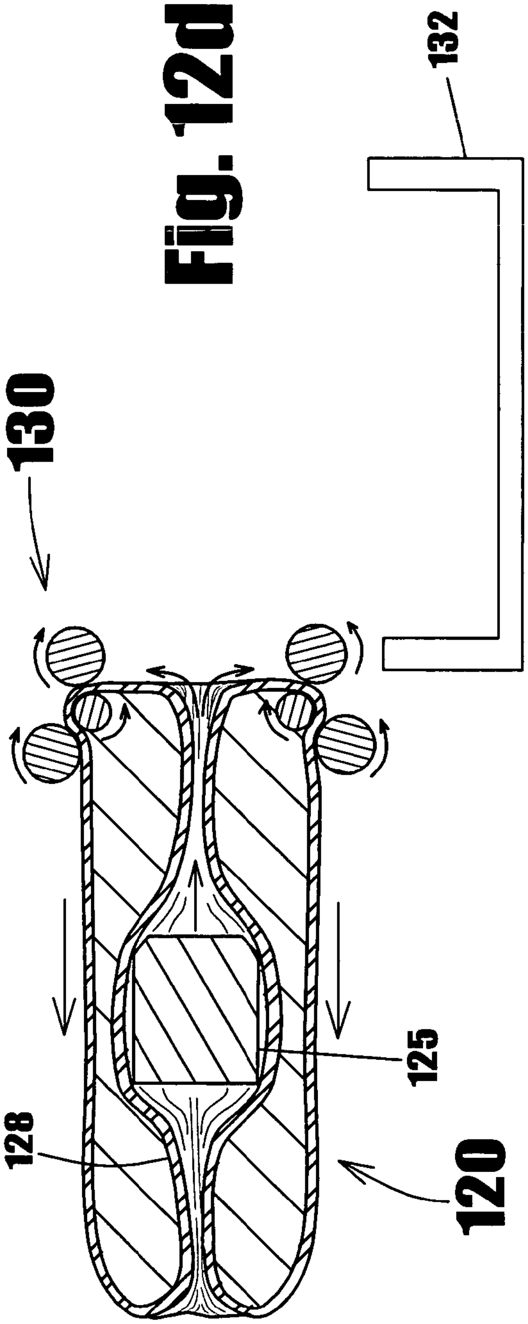
Figure 12E:
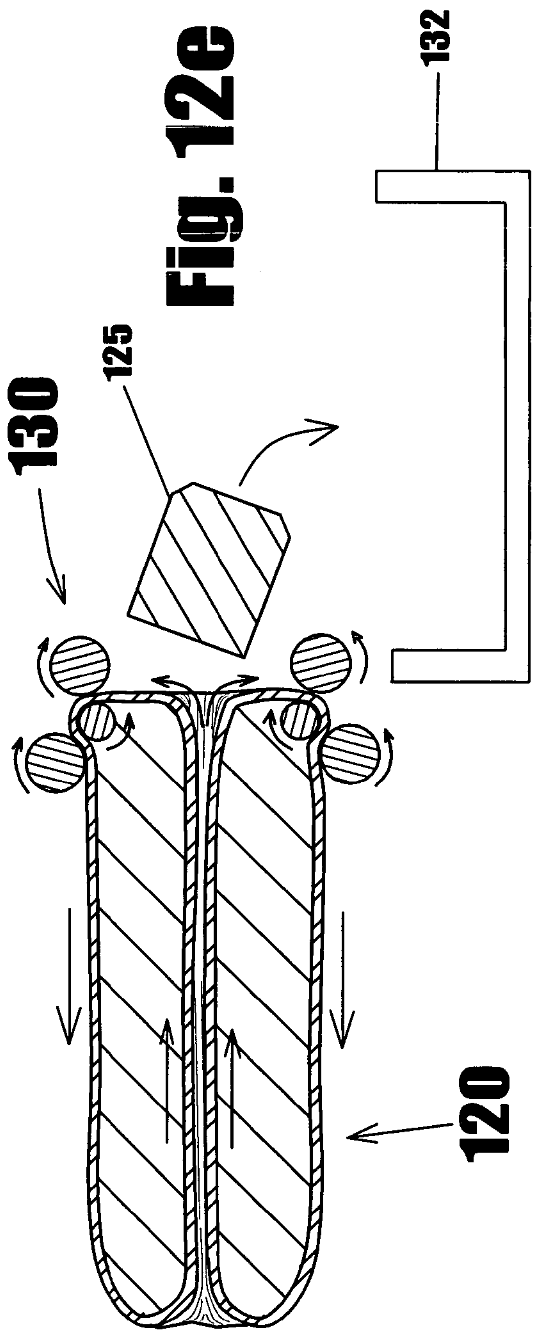

In FIGS. 12*a* through 12*e* we see torus 120 being driven by roller assembly 130 to grasp object 125. The annular housing and shroud for the roller assembly is not shown here for clarity of the drawing, and would simply attach to the rollers and protect them from the environment. The housing would also provide attachment to other mechanical devices such as a robotic arm. In FIG. 12*a* we see the torus being brought in contact with the object. Driven rollers 122*a* and 122*c* (see FIG. 15) on roller assembly 130, cause torus 120 to rotate by direct contact with the rollers. When rotating in the direction shown, torus 120 will grip object 125 as it makes contact of with object and begins to pull object 125 into the center channel 128 portion of the torus as shown in FIG. 12*b*. As the torus continues to rotate, object 125 moves even further into the center channel as seen in FIGS. 12*c* and 12*d*. If roller assembly 130 continues to rotate torus 120, object 125 will be ejected out the backside (rear end) of the torus and into bin 132 as shown in FIG. 12*e*. The roller assembly imparts motion to the torus by friction contact of a set of drive rollers 122*a* and 122*c* (see FIG. 15). These drive rollers are pressed against torus 120 by rollers 126*a* and 126*c* within the torus. The torus is kept from sliding backward through ring shaped roller assembly 130 (see FIG. 15) by the rollers 122*a–d* because the diameter spacing of the rollers is smaller than the diameter of the torus. This makes it difficult for the torus to force its way through the smaller opening formed by rollers 122*a–d*. However, if enough force is applied to the front portion of the torus it is possible to push the torus back through the opening between rollers 122*a–d*. Even if this happens, roller action in the direction shown will tend to return the torus to the position shown. Further, if rollers 124*a–d* where used as drive rollers, the torus would also tend to return to its normal position with respect to the roller assembly.

In FIG. 13 we see another torus gripper being driven by the same roller assembly 130 as seen in FIGS. 12*a–e*, 14 and 15. In this case torus 140 is made very long to allow roller assembly 130 to remain at a fixed position, while the gripping surface 144 of the torus is moved to grasp objects. Roller assembly 150 provides a means for controlling the gripping end of torus 140. Roller assembly 150 is passive in nature, and its rollers provide sufficient friction to keep torus 140 tight against rollers 154*a–b*. Since the central channel of the torus is being drawn back toward roller assembly 130, any friction on the rollers in assembly 150 will tend to push it forward toward the end surface 144. With torus 140 rotating, roller assembly 150 can be moved around its work area, gripping objects and transporting them up to bin 132 automatically. Several objects can be grasped and be in transit within the torus at any given time. Oil 142 within torus 140 coats the entire inner surface as the torus rotates to reduce wear due to friction of the torus membrane against itself. For practical reasons, this torus design is limited in its range of motion since the torus is only so long and can kink if twisted at large angles. Additional support rollers can also be added to help support the torus, however, when pressurized with air, the very light torus can get quite long before it will tend to buckle under its own mass. However, such additional support may be necessary if heavy objects will be transported through the torus.

In FIG. 14 we see the same alternative roller-driven gripper as in FIGS. 12*a–e*, with an additional tool 160 mounted on the front end of the gripper. In this case, tool 160 is used to grip anything holding onto the object being grasped (such as a vine or branch holding onto a berry or fruit). In operation, torus 120 would grip a fruit (or other object) and pull it partially into the center channel of the torus. Then bumpers 168*a&b* would be forced together by actuators 161*a&b* respectfully, trapping the vine or branch holding the fruit between the bumpers. Then roller assembly 130 would start moving the torus again, pulling the berry or fruit away from its vine or branch. The berry or fruit would continue out the back of the torus for collection in bin 132, and bumpers 168*a&b* would release the vine or branch before going on to grasp its next object. Cutters and many other tools could also be mounted with a standard torus gripper.

FIG. 15 shows an exploded view of roller assembly 130. Stepper motors 170*a* and 170*c* are used to drive rollers 122*a* and 122*c* respectfully. When in operation, roller assembly 134 is inside the torus and roller assembly 136 is positioned outside. Assembly 134 then snaps into assembly 136 with the torus membrane (not shown in this drawing) trapped between the rollers 126*a–d* and the rollers 122*a–d* and 124*a–d*. Stepper motors 170*a* and 170*c*, drive shafts 179*a* and 179*c* respectfully, which in turn drive rollers 122*a* and 122*c* respectfully. Physical contact between rollers 122*a* and 122*c* and the torus allows the rollers to impart motion to propel the torus. The drive rollers are evenly spaced, that is, symmetrically positioned around the assembly. Uneven drive rollers would tend to pull one side of the torus faster than the other, causing a bunching up of the torus membrane on the slow side. In FIG. 15, only two rollers are used to drive the torus and is sufficient to keep both sides of the torus moving together. Note that stepper motors 170*a* and 170*c* must rotate in opposite directions to drive the torus in the same direction in this example. If stepper motor 170*c* were moved to the other side of roller 122*c*, the two stepper motors could rotate in the same directions to move the torus (rollers rotating in the directions 177*a* and 177*c*). Also note that any of the rollers on assembly 136 could provide locomotion for the torus if a stepper motor were attached to them.

FIGS. 16*a* and 16*b* show a roller driven torus that is stationary. In this application the gripper operates as if it were a conveyer belt, gripping objects that are brought to it and transports them to the other end of torus 190. This action is very similar to a standard conveyer belt, however, the nature of the torus gripper allows it to transport object in ways other conveyers cannot. In FIG. 16*a* an object can be gripped and transported in either direction through torus 190 depending on which way the torus is being rotated by roller assemblies 194. In FIG. 16*a* torus 190 is shown rotating in the direction to grip objects on the left side of the torus and transport them up to the right end of the torus. If the direction of rotation for the roller assemblies is reversed the objects can be transported in the opposite direction (right to left). For this particular design, only one of the roller assemblies may be activated an any given time. Roller assembly 194 on the left would be activated to send objects to the right, while roller assembly 194 on the right end of torus 190 would be used to send objects to the left end of torus 190. Roller assemblies 192 provide additional support for the torus over long distances.

FIG. 16*b* shows two fixed torus being used as a multiple segment conveyer. Object 125 has been transported up from the other end of torus 190*a* and is resting between torus 190*a* and 190*b*. At this position, sensor 200 detects the objects presents and can initiate a number of options for the object. First, it can stop the torus from moving and just hold the object between torus 190*a* and 190*b* for the user to remove. Second, an actuator can come in from the side and push object 125 out into a bin (not shown) along path 199. This frees up the conveyer system for some else to use. Third, both torus 190*a* and 190*b* can be rotated, so that torus 190*b* will grip object 125 as torus 190*a* brings the object to it and continue moving the object up to the next level. Objects can just as easily be sent down the conveyer by rotating the torus in the opposite direction. In fact, with proper computer control, two objects can be sent to the same intersection (one from above and one from below) at the same time. The first object to arrive would be detected by sensor 200 and an actuator (not shown) would unload it, and then both torus would continue to rotate until the other object reached the junction where it would be unloaded. This provides a very quick and easy way to transport objects without the need to place them in containers. Unfortunately, sheets of paper would not be transport well with this system, and would be crumbled up into a mess by the time it reached its destination. Of course placing the papers in a simple container would solve this problem.

In FIG. 17 we see a gripper hand 300 being driven by a toothed gear 310. Gear 310 interacts with linear gears 308 and 306 to drive control rods 302 and 304 back and forth in opposite directions. Arrows 312*a* and 312*c* show the motion of control arms 302 and 304 resulting from the rotary motion of gear 310 shown by arrow 312*b*. The resulting motion is the same type as those seen in MODE 2 (see FIGS. 3*a–d*), where the gripping surface position remains stationary as the control rods rotate the torus membrane. If the system in FIG. 17, as a whole, is not translating, then any rotation of gear 310 will move control rods 302 and 304 equally in opposite directions parallel to the symmetric axis of torus 301. This in turn causes torus 301 to rotate about its internal volume, and creates a radial sliding motion at front surface 314 for gripping and releasing objects. Expander 318 allows the gripper to create cavity 317 when desired by rotating gear 310 counter-clockwise sufficiently to move control rod 304 forward and place expander 318 near the front end of torus 301 as shown in FIG. 17. An object that is moved within cavity 317 can be grasped from the sides without any net reaction force, simply by rotating gear 310 clockwise. The sides of the torus forming cavity 317 would then close (collapse) onto the object (object not shown) from the sides as expander 318 is pulled backward. Note that as the torus cavity closes in this way, the sides of the cavity are also moving backward and tend to pull the object inside (see FIGS. 10*a* and 10*b* for a perspective view of collapsing cavity 115 on torus 30).

SUMMARY, RAMIFICATIONS, AND SCOPE

The above specifications show several uses for the torus shaped mechanical hand (or gripper). These examples all have unusual operational characteristics that are not found in other robotic grippers. For example, a torus gripper can pick-up an over-ripe strawberry at high speed and, with a large degree of misalignment, still not bruise the strawberry. The soft, even pressure from the inflated torus produces no pressure points on objects, which makes it perfect for delicate items. The torus gripper may also quickly pick-up objects that other robotic grippers would never even attempt. For example, a torus gripper can pick up a pile of bolts or nuts from a surface without precision positioning of the gripper. The gripper simply grabs the bolts and nuts on top first and then when they are out of the way the next layer of bolts and nuts in the pile are pulled into the gripper. The torus gripper can also be made very lightweight when a gas, like air, is used as the fluid material. This allows it to be used on light-duty robots that could not support a heavy standard mechanical hand. The torus gripper's greatest advantage is its ability to pick-up almost anything that comes close to the front of the gripper. The high degree of position tolerance and orientation tolerance that the gripper allows will enable it to be used in ways that would be impossible for other robotic hands.

Although the above description of the invention contains many specifications, these should not be viewed as limiting the scope of the invention. Instead, the above description should be considered illustrations of some of the presently preferred embodiments of this invention. For example, the torus membrane may have any of a number of textured surfaces and styles for better wear and gripping characteristics. A knobby surface with a pattern of bumps can be used to provide better gripping and better wear resistance, while a wear-resistant fabric may be used to cover the membrane for gripping abrasive objects. The torus can also be manufactured in many different ways, some include: 1) placing one tube inside another and bonding their ends together, 2) using a single tube and threading one end down the center of the tube and sealing the two ends together, or 3) the torus can even be made by blow molding the torus shape in a mold. Other possibilities for the gripper would be to use more than one control rods per surface on the gripper. That is, two or more control rods are attached to the exterior or collapsed channel surface of the gripper to provide more evenly applied forces on the torus. Many torus membranes can be nested in large numbers or even placed side-by-side to grip many objects at one time. They could even be placed to form a grid pattern of grippers for picking-up and move many objects in a single motion (with each torus control rod connected a single exterior control rod). The use of round expanders such as torus 80 in FIG. 8, extension 114 in FIG. 10, and extension 318 in FIG. 17 should not be viewed as a limit on the different shapes an expander could take. For special application the central expander's cross-section may need to be very elongated to grip long thin objects (see FIG. 9). Likewise the exterior shaping surfaces can take many forms depending on the type of objects being gripped. Even roller assembly grippers can use expanders to reshape the torus by using rollers or other movable surface in contact with the torus. This reshaping can be on both the collapsed channel and the exterior portions of the torus. The torus itself also can be deformed or adjusted by allowing the pressure of the fluid material inside it to be changed while in operation. This can easily be accomplished by making one of the control rods hollow and connecting it to a fill port on the torus. The other end of the hollow control rod would be plugged into an actuator that could provide the proper fluid pressure (for example pressurized air) to inflate the torus for use. Many different configurations of the basic design are possible and the gripper's very dexterous abilities, along with a very tolerant positioning requirement, makes the list of applications for this device nearly endless.

Thus, the scope of this invention should not be limited to the above examples, but should be determined from the following claims.

We claim:

1. A mechanical conveyer for gripping and conveying objects, comprising:

a substantially torus shaped membrane elongated parallel to its symmetric axis with a front end, a rear end, an expanded exterior portion and a substantially collapsed central channel portion collinear with the symmetric axis of the torus;

said torus shaped membrane enclosing an interior volume filled with a fluid material;

said torus shaped membrane being sufficiently flexible to allow the collapsed central channel portion of the torus to be rotated to the position of the expanded exterior portion of the torus; and a roller assembly placed in rolling contact with said expanded exterior portion; and said roller assembly having at least one driven roller in physical contact with the torus to provide radial sliding motion of said front end, wherein the path through the collapsed central channel portion is unobstructed by said roller assembly, whereby objects can enter said front end and exit said rear end without making physical contact with the roller assembly.

2. The mechanical conveyer in claim 1, wherein the roller assembly allows continuous radial sliding motion of the membrane at the front and rear ends and continuous conveying of objects in at least one direction through the collapsed central channel portion of the torus shaped membrane.

3. The mechanical conveyer in claim 1, wherein:

said roller assembly is adapted for attachment to a robotic arm with said robotic arm providing power to drive said driven roller.

4. The mechanical conveyer in claim 1, further including:

a translatable roller assembly substantially attached to said front end of the torus and able to move said front end with respect to said roller assembly by mechanical control, whereby said torus shaped membrane acts as a movable conveyer that completely surrounds an object as it is transported from said front end of the torus to said rear end.

5. The mechanical conveyer in claim 1, further including:

at least one passive roller assembly placed along the length of the torus with said torus shaped membrane passing through said passive roller assembly; and wherein, said passive roller assembly provides substantially unhindered sliding of the expanded exterior portion therethrough.

6. The mechanical conveyer in claim 1, further including:

a housing designed for attachment to said roller assembly; and a tool element mounted on said housing and providing additional functions for the mechanical conveyer.

7. The mechanical conveyer in claim 1, wherein the roller assembly comprises an inner roller assembly positioned within said interior volume and an outer roller assembly positioned outside said torus shaped membrane, wherein the outer roller assembly grips the inner roller assembly through contact with the torus shaped membrane, thereby allowing the outer roller assembly to control the torus shaped membrane.

8. The mechanical conveyer in claim 7, wherein the roller assembly allows continuous radial sliding motion of the membrane at the front end and rear end for continuous conveying of objects in one direction through the collapsed central channel portion of the torus shaped membrane.

9. The mechanical conveyer in claim 8, further including:

a translatable roller assembly substantially attached to said front end of the torus and able to move said front end with respect to said roller assembly by mechanical control, whereby said torus shaped membrane acts as a movable conveyer that completely surrounds an object as it is transported from said front end of the torus to said rear end.

10. The mechanical conveyer in claim 8, further including:

at least one passive roller assembly placed along the length of the torus with said torus shaped membrane passing through said passive roller assembly; and wherein, said passive roller assembly provides substantially unhindered sliding of the membrane therethrough.

11. The mechanical conveyer in claim 8, further including:

a housing designed for attachment to said outer roller assembly; and a tool element mounted on said housing and providing additional functions for the mechanical conveyer.

12. A mechanical conveyer for gripping and conveying objects, comprising:

a substantially torus shaped membrane elongated parallel to its symmetric axis and defining an exterior surface, a substantially collapsed central channel, and an interior volume filled with a fluid material;

a first roller assembly placed in rolling contact with said exterior surface of the torus shaped membrane and having at least one driven roller in physical contact the exterior surface; and a second roller assembly placed within said interior volume;

wherein the second roller assembly forces the exterior surface of the torus shaped membrane against the first roller assembly so that the driven roller provides sufficient traction with the exterior surface to rotate the torus shaped membrane longitudinally around its interior volume, wherein the central channel through the torus shaped membrane is substantially unobstructed for conveying objects therethrough.

13. The mechanical conveyer in claim 12, wherein said exterior surface comprises a front end and a rear end, wherein the first and second roller assemblies are mounted substantially at said rear end.

14. The mechanical conveyer in claim 13, further including:

a housing designed for attachment to said first roller assembly; and a tool element mounted on said housing and providing additional functions for the mechanical conveyer.

15. The mechanical conveyer in claim 13, further including a second mechanical conveyer substantially similar to said mechanical conveyor, wherein the rear end of said mechanical conveyer is positioned in proximity to the front end of said second mechanical conveyer, wherein an object being conveyed by said mechanical conveyer can be transferred from the rear end of said first mechanical conveyer to the front end of said second mechanical conveyer for continuous conveying of the object therethrough.

16. The mechanical conveyer in claim 13, further including:

a translatable roller assembly substantially attached at said front end of the torus and able to move said front end with respect to said rear end by mechanically translating the translatable roller assembly, whereby said torus shaped membrane acts as a translatable conveyer.

17. The mechanical conveyer in claim 16, further including:

a housing designed for attachment to said translatable roller assembly; and a tool element mounted on said housing and providing additional functions for the mechanical conveyer.

18. The mechanical conveyer in claim 12, wherein said fluid material comprises a mixture of a gas and a lubricant.

19. The mechanical conveyer in claim 12, further including:

at least one passive roller assembly placed along the length of the torus shaped membrane and providing support for the torus shaped membrane through contact with the expanded exterior portion, wherein said passive roller assembly provides substantially unhindered sliding of the expanded exterior portion therethrough.

* * * * *